(12) United States Patent  
Kawakami et al.

(10) Patent No.: US 8,503,343 B2
(45) Date of Patent: Aug. 6, 2013

(54) WIRELESS COMMUNICATION SYSTEM, COMMUNICATION CONTROL METHOD AND COMMUNICATION NODE

(75) Inventors: Tetsuya Kawakami, Kanagawa (JP); Michiru Yokobori, Kanagawa (JP); Kazuhiko Miyamoto, Kanagawa (JP); Yoshihiro Suzuki, Tokyo (JP)

(73) Assignee: Panasonic Corporation, Osaka (JP)

( * ) Notice: Subject to any disclaimer, the term of this patent is extended or adjusted under 35 U.S.C. 154(b) by 610 days.

(21) Appl. No.: 12/376,495

(22) PCT Filed: Aug. 17, 2007

(86) PCT No.: PCT/JP2007/066011
§ 371 (c)(1),
(2), (4) Date: Feb. 5, 2009

(87) PCT Pub. No.: WO2008/023638
PCT Pub. Date: Feb. 28, 2008

(65) Prior Publication Data
US 2010/0278087 A1 Nov. 4, 2010

(30) Foreign Application Priority Data

Aug. 21, 2006 (JP) ................. 2006-224664
Aug. 31, 2006 (JP) ................. 2006-235731

(51) Int. Cl.
*G08C 17/00* (2006.01)
(52) U.S. Cl.
USPC ......................................... 370/311; 370/337
(58) Field of Classification Search
USPC ................................. 370/311, 337
See application file for complete search history.

(56) References Cited

U.S. PATENT DOCUMENTS 7,218,623 B1 * 5/2007 Proctor, Jr. .................... 370/335
7,412,265 B2 * 8/2008 Chen et al. .................... 455/574
(Continued)

FOREIGN PATENT DOCUMENTS

| CN | 1685646 A | 10/2005 |
| JP | 2005-210698 A | 8/2005 |
| JP | 2006-148906 A | 6/2006 |

OTHER PUBLICATIONS

Chinese Office Action dated Apr. 20, 2011.
(Continued)

*Primary Examiner* — Brandon Renner
*Assistant Examiner* — Faisal Choudhury
(74) *Attorney, Agent, or Firm* — Pearne & Gordon LLP

(57) ABSTRACT

A technique is disclosed, by which it is possible to achieve the reduction of power consumption of each wireless node and to perform efficient access control in wireless communication system. According to this technique, a given period with a beacon transmitted from a gateway (GW) 100 at the foremost position is divided to an active period where each wireless node (P2P tag) transmits and receives a frame and a sleep period where transmitting and receiving of the frames are stopped. Further, the active period is divided to a plurality of timeslots each with a fixed length, and the period is partitioned to sub-periods where each type of a GW, a fixed node (P2P-S tag), and a mobile node (P2P-M tag) can transmit frames respectively. Each of the P2P tags selects a timeslot at random from the period for each type, and after waiting for a waiting period at random at the selected timeslot, it transmits a frame including information to identify the selected timeslot or the waiting period in addition to its own ID.

9 Claims, 19 Drawing Sheets

U.S. PATENT DOCUMENTS

| | | | |
|---|---|---|---|
| 7,616,602 B2 * | 11/2009 | Choi et al. | 370/329 |
| 7,787,401 B2 * | 8/2010 | Kinder et al. | 370/310 |
| 7,925,215 B2 * | 4/2011 | Takayama | 455/41.2 |
| 2002/0105970 A1 * | 8/2002 | Shvodian | 370/468 |
| 2004/0131034 A1 * | 7/2004 | Sugaya | 370/337 |
| 2004/0174895 A1 * | 9/2004 | Hiraoka et al. | 370/442 |
| 2005/0031347 A1 * | 2/2005 | Soto et al. | 398/58 |
| 2005/0124313 A1 * | 6/2005 | Simpson et al. | 455/343.3 |
| 2005/0190784 A1 * | 9/2005 | Stine | 370/445 |
| 2005/0259723 A1 * | 11/2005 | Blanchard | 375/146 |
| 2006/0092909 A1 * | 5/2006 | Ho | 370/348 |
| 2006/0099980 A1 * | 5/2006 | Nielsen et al. | 455/507 |
| 2006/0114862 A1 * | 6/2006 | Hiraoka | 370/337 |
| 2006/0268891 A1 * | 11/2006 | Heidari-Bateni et al. | 370/395.4 |
| 2007/0008947 A1 * | 1/2007 | Belcea | 370/350 |
| 2007/0178875 A1 * | 8/2007 | Rao et al. | 455/343.1 |
| 2007/0274280 A1 * | 11/2007 | Haas et al. | 370/348 |
| 2008/0175218 A1 * | 7/2008 | Yoshida et al. | 370/345 |
| 2008/0192703 A1 * | 8/2008 | Suzuki | 370/335 |
| 2008/0253327 A1 * | 10/2008 | Kohvakka et al. | 370/330 |
| 2009/0067389 A1 * | 3/2009 | Lee et al. | 370/336 |
| 2009/0257410 A1 * | 10/2009 | Liu | 370/336 |

OTHER PUBLICATIONS

Masatoshi Sekine, et al "A Mac Protocol for Reducing Collision in Sensor Networks" IEICE Technical Report NS2004-65, vol. 104, No. 183, pp. 73-76, Jul. 8, 2004.

International Search Report for PCT/JP2007/066011.

* cited by examiner

FIG. 13

| 1701 | 1702 | 1703 |

| SLOT RESERVATION INDICATOR | TRANSMISSION SOURCE NODE ID | DATA |

FIG. 14

| NODE ID | RECEIVING SLOT | RESERVED SLOT |
|---------|----------------|---------------|
| NODE 2  | SLOT 2         | SLOT 2        |
| NODE 3  | SLOT 5         | SLOT 5        |
| NODE 4  | SLOT 8         | –             |

FIG. 15

DATA RECEIVING TABLE AT THE INITIATION OF AP1

| NODE ID | RECEIVING SLOT | RESERVED SLOT |
|---|---|---|
|  |  |  |
|  |  |  |
|  |  |  |

DATA RECEIVING TABLE AT THE INITIATION OF AP2

| NODE ID | RECEIVING SLOT | RESERVED SLOT |
|---|---|---|
| NODE 2 | SLOT 4 | SLOT 4 |
| NODE 3 | SLOT 8 | SLOT 8 |
|  |  |  |

DATA RECEIVING TABLE AT THE INITIATION OF AP3

| NODE ID | RECEIVING SLOT | RESERVED SLOT |
|---|---|---|
| NODE 2 | SLOT 4 | SLOT 4 |
| NODE 3 | SLOT 8 | SLOT 8 |
|  |  |  |

DATA RECEIVING TABLE AT THE INITIATION OF AP4

| NODE ID | RECEIVING SLOT | RESERVED SLOT |
|---|---|---|
| NODE 2 | SLOT 4 | – |
| NODE 3 | SLOT 8 | – |
|  |  |  |

WIRELESS COMMUNICATION SYSTEM, COMMUNICATION CONTROL METHOD AND COMMUNICATION NODE

TECHNICAL FIELD

The present invention relates to a wireless communication system, a communication control method and a communication node. In particular, the invention relates to a wireless communication system, a communication control method and a communication node for achieving media access control (MAC) with low power consumption in case a mobile communication node exchanges data bi-directionally.

BACKGROUND ART

In a wireless hardware of a wireless system, the reduction of power consumption is an important factor. In particular, in a wireless communication system, as examples of application, for which a power-saving mechanism is needed, there are an active electronic tag system, a sensor network system, etc. For sensor nodes in the active electronic tag or in the sensor network, portability and easy and flexible installation are important features. Normally, it is a battery type node incorporated with a small-size battery.

The applications such as the active electronic tag system or the sensor network system are characterized by low traffic. In the active electronic tag system, small-size data including the active electronic tag's own ID (identification information) is transmitted. Also, in the sensor network system, the sensor node performs intermittent transmission of small-size sensing data in most cases.

In the active electronic tag system, the exchange of information is conducted in such manner that data transmission from the electronic tag is received by a reader. In normal case, the active electronic tag does not have any relation with the other active electronic tag, and for the purpose of receiving information from the active electronic tag transmitted at random, the reader must have its receiver always ready for starting. Also, in the active electronic tag system, each of the active electronic tags independently behaves, and data collision may occur due to simultaneous transmission of a plurality of active electronic tags.

In order to cope with the diversification of the mode of the use of communication in recent years, it is important that the communication must be performed bi-directionally. In the active electronic tag system, however, uni-directional communication is performed from the electronic tag to the reader. Even when a node, which serves as reader/writer in one unit, may be used with the electronic tag, and it is difficult to reduce the power consumption because the receiver is always in starting state, and there are also problems in access control (collision avoidance control).

As described above, the reduction of power consumption in the wireless equipment and system is an important factor, and several methods have been proposed to solve the problems in the past. On of the methods is that, in low traffic network such as a sensor network, when no data is transmitted and received and a wireless circuit (wireless communication function) is not used, the wireless circuit is turned off (to a sleeping state). In this type of intermittent communication, when the wireless circuit is turned off at both the transmitting side and the receiving side, it is important how synchronization is performed between the transmitting node and the receiving node in the timing of transmission and receiving.

One method for solving the problem in the intermittent bi-directional communication is a method to adopt ZigBee (registered trademark) using MAC layer as defined in IEEE 802.15.4. According to IEEE 802.15.4, when a synchronous node called "beacon mode" is used, each node is synchronized by a beacon transmitted from a coordinator acting as a control unit. Also, in ZigBee, by defining a super-frame as shown in FIG. 20 and by increasing beacon interval longer than the super-frame period, an idle period or an inactive period can be defined. All of the synchronized nodes can be made in the sleeping state during this idle period. When data transmission is carried out according to synchronization schedule by the super-frame, data can be received at each of the nodes.

According to IEEE 802.15.4, the super-frame period is divided to 16 slots (timeslots). When the data are transmitted, each node selects a slot and transmits the data by using CSMA/CA (Carrier Sense Multiple Access with Collision Avoidance) within the slot and the change of data transmission can be maintained in fair and adequate manner between the nodes even in case the number of the nodes in the system has increased.

In the latter half of the super-frame period, a guaranteed time slot (GTS) is defined. This GTS is a period where it is guaranteed that the coordinator can preferentially use the slot to a specific node. Therefore, the communication at this GTS is not allowed to the node other than the specific node, to which the use of the communication by GTS is permitted. As shown in FIG. 20, the length of GTS is assigned when the node negotiates with the coordinator. As a result, communication can be performed by avoiding the collision of the transmission data.

However, according to IEEE 802.15.4, the slot to be used at GTS within the super-frame is limited. When the number of nodes to request slot reservation is increased, it is difficult that all nodes requesting the slot reservation receives the assignment of GTS in a single super-frame period. In this case, the node, which could not receive the slot reservation, must wait until the next super-frame period. So far as it is configured that the assignment of GTS is received from the coordinator and the coordinator is notified that GTS has been assigned to a node, which is present within the range where electric wave can reach, network topology is limited to star type. The star type topology lacks flexibility in its configuration, and it has such defect that it is used under the assumption of topology when a mobile node performs communication.

As described above, in order that the slot reservation is executed according to IEEE 802.15.4, there is a limitation to the number of slots, which can be used for the slot reservation in a single super-frame period. Also, according to IEEE 802.15.4, a coordinator for the management of the slot reservation must be present. As a result, there is a restriction in the network configuration (restriction on the network topology).

Unlike the case of the communication at the super-frame of ZigBee, a technique to reduce power consumption in beaconless solution without system synchronization by beacon is disclosed in the Patent Document 1 as given below (see FIG. 21). According to the technique disclosed in this Patent Document 1, when it is set to $T_L \ll T_{PL}$ where $T_{PL}$ is a monitoring cycle and $T_L$ is a monitoring period, each receiving node is started for a certain fixed time periodically and monitors air interface.

On the other hand, a transmission source node (source node) issues a wakeup signal (WU) during this $T_{PL}$ period. As a result, each of the receiving nodes grasps that the data corresponding to the wakeup signal is transmitted during $T_L$, which is own receiving period of the node itself. When information relating to the time to start the transmission (time pointer) is included in the wakeup signal, it is possible to grasp the starting time (the time to start data transmission).

Further, in case destination address is included in the wakeup signal as the information to be transmitted on the wakeup signal, if only the node, which has received the wakeup signal, starts the receiving unit, the starting time of the other node can be decreased. Also, it is possible to shorten the transmission time to transmit the wakeup signal, which is needed during the period of the monitoring cycle $T_{PL}$, if sampling schedule of each node is held as table information by mutually giving and taking the time to terminate the communication and the time to start the communication in the next monitoring period of the node at each communication.

In the system disclosed in the Patent Document 1, the transmitted data is preferentially received when the starting time of each of the receivers of a plurality of nodes is equalized. Further, the starting time to start data transmission can be designated to the time as requested by the node by sending the wakeup signal, and it is also configured that the data transmission is preferentially controlled.

However, in the system disclosed in the Patent Document 1, the wakeup signal must be transmitted during the period of the monitoring cycle $T_{PL}$ until the table information is obtained. As suggested in the Patent Document 1, not only that the power is consumed at the transmission source node but also wireless channel is occupied for a considerable period of the time cycle. As a result, the transmission of other wakeup signal by the other node may be hindered or collision may occur in the other transmission currently going on. In particular, when communication is performed by a multiple of unspecific wireless nodes while these are moving, it is considered that the chance where the giving and the taking of the wakeup signal are needed until the completion of the first table configuration.

Therefore, in the system as disclosed in the Patent Document 1 as given above, for the purpose of executing preferential control of the data transmission, it is necessary to have long channel occupying period and long setting time until the data transmission is started.

[Patent Document 1] Japanese Patent Application Publication No. 2006-148906

In order to reduce power consumption in the wireless communication system, data transmission techniques by periodical data transmission (communication by radio frequency identification (RFID) or the use of active electronic tag or by ALOHA system using periodical broadcasting) are effective as the simplified data transmitting means to a plurality of nodes in wireless short distance communication without specifying the correspondent node (CN). In particular, the data transmission technique by periodical data transmission is effective for the communication between mobile nodes (MN). The effectiveness of this technique lies in that it is possible to decrease the number of messages to be exchanged by performing the communication according to a simplified protocol, to reduce data transmitting/receiving time by decreasing the amount of the transmission data, and to speed up the processing of power saving and to quickly start and terminate data exchange.

In case short data (data of small data amount) is transmitted periodically, there is a limitation in the amount of information to be exchanged between two nodes by a single data transmission and receiving. In this case, the amount of information to be transmitted by many of data transmission and receiving can be increased, but wireless communication must be guaranteed, which causes no collision in the data transmission. However, the simplified protocol is not configured to avoid the possibility of the collision of data transmission, and reliable maintenance of the wireless communication route cannot be guaranteed.

Also, according to IEEE 802.15.4, the guarantee of the slot by GTS is defined in the super-frame period, while a problem arises in that there is a limit (upper limit) to the number of slots to be used for slot reservation within a single superframe period. Also, a coordinator for the management of the slot reservation is needed, and there is also a problem that there may be restriction to the configuration of the network. The network topology restricted by IEEE 802.15.4 is not suitable for the case where data transmission and receiving are performed by P2P (Peer to Peer) between MNs.

According to the system disclosed in the Patent Document 1, it is possible to guarantee the data transmission and receiving by uniformly synchronizing the starting time of the receiver of peripheral nodes by defining the wakeup signal, while there is a problem in that the channel occupying period (a period from the transmission of the wakeup signal to the transmission of data) is long, during which the channel is occupied by the wakeup signal transmitted before the starting of the data transmission by a certain node. As a result, when the transmission nodes increase, the chances of the occupying of the channel are increased, and this makes it difficult to guarantee the data transmission. When the attention is given on the data transmission and receiving between MNs, the period from the transmission of the wakeup signal to the transmission of data is long, and when MN transmits the data while the channel is occupied by the wakeup signal, it may move out of the propagation range (i.e. the communication between MNs may not be performed).

In the technique disclosed in the Patent Document 1 as given above, the wakeup signal must be transmitted within the period of the monitoring cycle $T_{PL}$ until the table information is obtained. As suggested by the Patent Document 1, the power of the transmission source node is consumed during this period and the wireless channel is occupied during a considerable length of the period of time cycle. As a result, the transmission of the other wakeup signal by the other node may be hindered or collision may occur in the other transmission, which is currently going on.

In particular, when a multiple of unspecified wireless nodes perform communication while moving, the cases where the giving and the taking of the data for long period using the wakeup signal WU may be increased until the first table configuration, and this means that power may be consumed uselessly. Similarly, in the case where transmission is performed to a multiple of unspecified nodes (broadcast or multi-cast), the wakeup signals must be notified during the monitoring period of each node, and power may be consumed uselessly. In the system where information of the data to be transmitted is to be notified by the wakeup signal before the actual outputting of data and where the timing of transmission and receiving is to be synchronized with the receiving node, the wakeup signals must be relatively large with respect to the data when small data is given and taken not very frequently, and this may make the communication inefficient.

In the technique disclosed in the Patent Document 1, when sampling schedule of each node is held as table information, the transmitting node transmits the wakeup signal only during the monitoring period of the receiving node (i.e. the correspondent node) and it notifies the timing to start its own transmission. Unlike the case where the wakeup signal is transmitted during the monitoring cycle $T_{PL}$, the node to recognize the data transmission period of the transmitting node is only the receiving node, which is the correspondent node. Thus, even when the other transmitting node may have the possibility to transmit the data at the same time to the other receiving node, it is not possible to detect it. As a result, the probability of signal collision may increase, and it may be difficult to have adequate access control (collision avoidance control) between the transmitting nodes.

DISCLOSURE OF THE INVENTION

To solve the above problems, it is an object of the present invention to provide a wireless communication system, a communication control method and a communication node, by which it is possible to reduce power consumption when a multiple of small-size mobile wireless nodes perform communication and to achieve efficient access control in the wireless communication system including small-size wireless nodes, which can perform communication bi-directionally.

To attain the above object, the wireless communication system according to the present invention comprises a plurality of wireless nodes, where an active period and a sleep period are repeated at a given period, transmitting and receiving operations being performed in said active period and transmitting and receiving operations being stopped in said sleep period, wherein it is so arranged that synchronization control of said active period is carried out when a frame to indicate transmission timing information in said active period is transmitted and received.

With the arrangement as described above, it is possible to reduce power consumption and to achieve efficient access control when a multiple of small-size mobile wireless nodes perform communication in a wireless communication system including small-size wireless node, which can perform bi-directional communication.

Further, in addition to the arrangement as described above, the present invention provides the wireless communication system as described above, wherein it is so arranged that said active period comprises a plurality of timeslots each with a fixed length, and a slot number at the time of frame transmission is used in said transmission timing information.

With the arrangement as described above, it is possible to reduce power consumption and to achieve efficient access control when a multiple of small-size mobile wireless nodes perform communication in a wireless communication system including small-size wireless node, which can perform bi-directional communication.

Also, in addition to the arrangement as described above, the present invention provides the wireless communication system as described above, wherein it is so arranged that synchronization is readjusted by preferentially using said transmission timing information indicated by a specific frame received in said active period.

With the arrangement as described above, it is possible to reduce power consumption and to achieve efficient access control when a multiple of small-size mobile wireless nodes perform communication in a wireless communication system including small-size wireless node, which can perform bi-directional communication.

Further, in addition to the arrangement as described above, the present invention provides the wireless communication system as described above, wherein it is so arranged that synchronization is readjusted by preferentially using said transmission timing information included in a specific timeslot received in said active period.

With the arrangement as described above, it is possible to reduce power consumption and to achieve efficient access control when a multiple of small-size mobile wireless nodes perform communication in a wireless communication system including small-size wireless node, which can perform bi-directional communication.

Also, in addition to the arrangement as described above, the present invention provides the wireless communication system as described above, wherein said system comprises a basis wireless node for transmitting a basis timing of said communication system, wherein it is so arranged that a frame outputted from said basis wireless node is used as a frame to indicate said transmission timing information in said active period.

With the arrangement as described above, it is possible to reduce power consumption and to achieve efficient access control when a multiple of small-size mobile wireless nodes perform communication in a wireless communication system including small-size wireless node, which can perform bi-directional communication.

Further, in addition to the arrangement as described above, the present invention provides the wireless communication system as described above, wherein said system comprises a basis wireless node for transmitting a basis timing of said communication system, wherein it is so arranged that said basis wireless node transmits a frame to indicate transmission timing information in said active period to said specific timeslot.

With the arrangement as described above, it is possible to reduce power consumption and to achieve efficient access control when a multiple of small-size mobile wireless nodes perform communication in a wireless communication system including small-size wireless node, which can perform bi-directional communication.

Also, in addition to the arrangement as described above, the present invention provides the wireless communication system as described above, wherein it is so arranged that said basis wireless node transmits a frame to indicate transmission timing information in said active period in a first timeslot, said first timeslot constituting said active period.

With the arrangement as described above, it is possible to reduce power consumption and to achieve efficient access control when a multiple of small-size mobile wireless nodes perform communication in a wireless communication system including small-size wireless node, which can perform bi-directional communication.

Further, in addition to the arrangement as described above, the present invention provides the wireless communication system as described above, wherein it is so arranged that each of said wireless nodes readjusts synchronization based on said transmission timing information indicated by a first received frame in said active period.

With the arrangement as described above, it is possible to reduce power consumption and to achieve efficient access control when a multiple of small-size mobile wireless nodes perform communication in a wireless communication system including small-size wireless node, which can perform bi-directional communication.

Also, in addition to the arrangement as described above, the present invention provides the wireless communication system as described above, wherein:

said active period comprises a plurality of timeslots each with a fixed length;

a wireless node synchronized with said active period comprises a frame transmitting means for transmitting, after selecting said timeslot at random at the time of data transmission, a frame added with a slot number of said selected timeslot as synchronization information; and a wireless node comprises a synchronizing means for performing, after receiving said frame added with said synchronization information synchronizing processing on said active period based on said synchronization information in said frame.

With the arrangement as described above, the other wireless node can synchronize by using a frame transmitted from a wireless node synchronized by a frame transmitted by a basis node, and a wireless node, which cannot directly communicate with the basis node, can transmit and receive by sequentially synchronizing. Also, by this arrangement, the data exchange by the wireless node can be carried out in wider area. Also, there is no need to maintain the transmitter/receiver always at starting condition, and it is possible to achieve efficient access control and to reduce power consumption.

Further, in addition to the arrangement as described above, the present invention provides the wireless communication system as described above, wherein it is so arranged that said synchronization information further includes transmission timing information within said timeslot to transmit said frame.

With the arrangement as described above, it is possible to improve the accuracy of synchronization processing performed at the receiving of the frame.

Also, in addition to the arrangement as described above, the present invention provides the wireless communication system as described above, wherein it is so arranged that said frame transmitting means selects said timeslot at random to transmit said frame, confirms a using condition of transmission route by CSMA/CA, and transmits said frame only in case it is judged that said timeslot to transmit said frame is not in use.

With the arrangement as described above, it is possible to confirm by CSMA/CA at the foremost position of each timeslot and to reduce the probability of frame collision between the wireless nodes selected by the same timeslot and the possibility to hinder frame transmission. As a result, the error of the frame caused by collision can be avoided and the reliability can be improved.

Further, in addition to the arrangement as described above, the present invention provides the wireless communication system as described above, wherein it is so arranged that said frame transmitting means selects a timing to start transmission of said frame at random from a plurality of timings at said timeslot selected for transmission of said frame.

With the arrangement as described above, by selecting transmission timing from a plurality of transmission timings at a timeslot, the probability of collision can be reduced, and it is possible to avoid the error of the frame caused by collision, and to improve the reliability.

Also, in addition to the arrangement as described above, the present invention provides the wireless communication system as described above, wherein it is so arranged that said synchronizing means performs monitoring of a frame on a transmission route during one beacon period at maximum when own wireless node is in non-synchronized state to said active period, said beacon period being said given period including said active period and said sleep period, and performs synchronization processing based on synchronization information included in said received frame.

With the arrangement as described above, it is possible to start the transmitter/receiver only in the active period for the monitoring of the frame by synchronizing with the active period and to reduce power consumption of the wireless node.

Further, in addition to the arrangement as described above, the present invention provides the wireless communication system as described above, wherein it is so arranged that said synchronizing means performs synchronization readjustment processing based on said synchronization information included in a first received frame in said active period in case own wireless node is already synchronized to said active period.

With the arrangement as described above, a wireless node, which can receive the frame of the basis node, can perform synchronization based on the received frame from the basis node as received at the first timeslot in the active period and can reduce power consumption by carrying out re-synchronization processing only once based on the first received frame even when the frame is received from the other wireless node.

Also, in addition to the arrangement as described above, the present invention provides the wireless communication system as described above, wherein it is so arranged that said wireless node belongs to either type of a fixed node fixedly set or a mobile node to move, said fixed node performs monitoring of a frame on a transmission route during one beacon period at maximum when own wireless node is in non-synchronized state to said active period, said beacon period being said given period including said active period and said sleep period, and does not perform synchronization processing in case said frame from the basis wireless node to transmit basis timing of said communication system or from said fixed node cannot be received.

With the arrangement as described above, a fixed node can perform synchronization processing only when it can communicate with the basis node or the other fixed node. As a result, even when there is no basis node in case an area is cut off, synchronization processing is performed according to the frame from the mobile node, and it is possible to prevent the operation of the wireless communication system where deviation occurs in the synchronization.

Further, in addition to the arrangement as described above, the present invention provides the wireless communication system as described above, wherein it is so arranged that said wireless node belongs to either type of a fixed node fixedly set or a mobile node to move, said timeslot of said active period being divided to a timeslot for the basis wireless node to transmit basis timing of said communication system, to a timeslot for said fixed node, and to a timeslot for said mobile node set up thereafter, and said mobile node does not perform monitoring of a frame on a transmission route in said timeslot for the mobile node in case said frame has been received at the timeslot for said basis wireless node or for said fixed node.

With the arrangement as described above, a mobile node, which received the frame at a timeslot for the basis node or at a timeslot for the fixed node, has no need to perform the monitoring processing in the subsequent active period, and power consumption can be reduced.

Also, in addition to the arrangement as described above, the present invention provides the wireless communication system as described above, wherein it is so arranged that, when said frame has been received at a timeslot for basis wireless node to transmit basis timing of said communication system or for said fixed node in said active period, said wireless node compares said frame with said basis wireless node or with said fixed node received in previous active period, and said wireless node performs frame transmission processing by said frame transmitting means only in case the frame has been received from a different wireless node.

With the arrangement as described above, when a mobile node remains at the same position, it is possible to enter the sleep processing from a timeslot for the mobile node, and power consumption can be reduced.

Further, in addition to the arrangement as described above, the present invention provides the wireless communication system as described above, wherein it is so arranged that said wireless node does not carry out synchronization readjustment processing in said active period in case said frame is not received at any of the timeslots in said active period, and said wireless node continues communication in synchronized state in the previous active period, and in case said frame has not been received at any of the timeslots continuously for the prescribed number of times or more, it is regarded as out of synchronization, and said wireless node performs processing to be performed in non-synchronized state.

With the arrangement as described above, even when the frame cannot be received from the other wireless node, synchronization readjustment processing is not performed by judging that synchronization has gone off, but it is judged that it is in a state where synchronization is gone off (i.e. it is in non-synchronized state) only when the non-synchronized state is detected as many times as determined in advance, and it is possible to reliably confirm whether it is in synchronized state or in non-synchronized state.

Also, in addition to the arrangement as described above, the present invention provides the wireless communication system as described above, wherein it is so arranged that said wireless node reserves a specific transmission timing in the next active period when transmitting a packet at a specific transmission timing within an arbitrary active period.

With the arrangement as described above, in a wireless communication system including small-size wireless nodes, which can perform bi-directional communication, it is possible to guarantee the chance of transmission for the purpose of reducing power consumption and of achieving efficient access control when a multiple of small-size mobile wireless nodes perform communication.

Further, in addition to the arrangement as described above, the present invention provides the wireless communication system as described above, wherein it is so arranged that said wireless node reserves a timeslot in communication in the next active period when transmitting a packet at an arbitrary timeslot in an arbitrary active period.

With the arrangement as described above, in a wireless communication system including small-size wireless nodes, which can perform bi-directional communication, it is possible to guarantee the chance of transmission for the purpose of reducing power consumption and of achieving efficient access control when a multiple of small-size mobile wireless nodes perform communication.

Also, in addition to the arrangement as described above, the present invention provides the wireless communication system as described above, wherein it is so arranged that a specific timing in the next active period present at the same position as a specific transmission timing where said packet can be transmitted at a specific transmission timing within said arbitrary active period is reserved as said specific transmission timing in communication in said next active period.

With the arrangement as described above, when data transmission is performed by the same wireless node in a plurality of active periods, the same transmission timing is selected. As a result, the relation between a specific wireless node and the transmission timing of data transmission can be clearly identified.

Further, in addition to the arrangement as described above, the present invention provides the wireless communication system as described above, wherein it is so arranged that a timeslot in the next active period present at the same position as a timeslot where said packet can be transmitted at an arbitrary timeslot in said arbitrary active period is reserved as said timeslot in communication of said next active period.

With the arrangement as described above, when data transmission is performed by the same wireless node in a plurality of active periods, the same timeslot is selected. As a result, the relation between a specific wireless node and the timeslot of data transmission can be clearly identified.

Also, in addition to the arrangement as described above, the present invention provides the wireless communication system as described above, wherein it is so arranged that said wireless node having reserved said timeslot performs processing for transmitting said packet from a foremost position of timeslots in communication in said next active period.

With the arrangement as described above, the communication can be preferentially performed by the wireless node, which has reserved the timeslot.

Further, in addition to the arrangement as described above, the present invention provides the wireless communication system as described above, wherein it is so arranged that, when receiving a packet including a request of reservation of said specific transmission timing from other wireless node, said wireless node avoids said specific transmission timing to request reservation by said other node and selects transmission timing for data transmission.

With the arrangement as described above, a packet to declare the reservation of the transmission timing is notified to the other nodes in the neighborhood, and the notified node can refrain from using the transmission timing, which is already reserved.

Also, in addition to the arrangement as described above, the present invention provides the wireless communication system as described above, wherein it is so arranged that, when receiving a packet including a request of reservation of said timeslot from other wireless node, said wireless node avoids said timeslot requested reservation by said other wireless node and selects the timeslot for data transmission.

With the arrangement as described above, a packet to declare the reservation of the transmission timing is notified to the other nodes in the neighborhood, and the notified node can refrain from using the transmission timing, which is already reserved.

Further, in addition to the arrangement as described above, the present invention provides the wireless communication system as described above, wherein it is so arranged that, in case a packet including a request of reservation of said specific transmission timing is not received from other wireless node, said wireless node searches a transmission timing for data transmission so that said data transmission may not collide with data transmission by said other wireless node.

With the arrangement as described above, the wireless node, which did not receive a packet to declare the reservation of the transmission timing, can transmit the data by searching the transmission timing for its own data transmission.

Also, in addition to the arrangement as described above, the present invention provides the wireless communication system as described above, wherein it is so arranged that, in case a packet including a request of reservation of said timeslot is not received from other wireless node, said wireless node searches a timeslot where data transmission can be performed so that said data transmission may not collide with data transmission by said other wireless node.

With the arrangement as described above, the wireless node, which did not receive a packet to declare the reservation of the timeslot, can transmit the data by searching the timeslot for its own data transmission.

Further, in addition to the arrangement as described above, the present invention provides the wireless communication system as described above, wherein it is so arranged that, when said wireless node transmits a packet at a specific transmission timing in an arbitrary active period, said wireless node reserves a chance of communication in said next active period by specifying a specific transmission timing in the next active period.

With the arrangement as described above, a wireless node to perform packet transmission in a certain active period can reserve a chance of communication in the next active period by designating a specific transmission timing in the next active period.

Also, in addition to the arrangement as described above, the present invention provides the wireless communication system as described above, wherein it is so arranged that said wireless node reserves a timeslot to be used in said next active period by specifying said timeslot in the next active period in a packet to transmit a timeslot in an arbitrary active period.

With the arrangement as described above, a wireless node to perform packet transmission in a certain active period can reserve a timeslot in the next active period by designating a specific transmission timing in the next active period.

Also, to attain the above object of the invention, the present invention provides a wireless communication system, comprising a plurality of wireless nodes, where an active period and a sleep period are repeated at a given period, said active period consisting of a plurality of timeslots each with a fixed length where said plurality of wireless nodes can transmit and receive data, a transmitting/receiving unit of said wireless node being in inactive state in said inactive period, wherein it is so arranged that, when transmitting a packet at an arbitrary timeslot in an arbitrary active period, said wireless node reserves a timeslot in the communication in the next active period.

With the arrangement as described above, in a wireless communication system including small-size wireless nodes, which can perform bi-directional communication, it is possible to guarantee the chance of transmission for the purpose of reducing power consumption and of achieving efficient access control when a multiple of small-size mobile wireless nodes perform communication.

Further, in addition to the arrangement as described above, the present invention provides the wireless communication system as described above, wherein it is so arranged that a timeslot in the next active period present at the same position as a timeslot where said packet can be transmitted at an arbitrary timeslot in said arbitrary active period is reserved as said timeslot in the communication in said next active period.

With the arrangement as described above, when data transmission is performed by the same wireless node in a plurality of active periods, the same timeslot is selected. As a result, the relation between a specific wireless node and the timeslot of data transmission can be clearly identified.

Also, in addition to the arrangement as described above, the present invention provides the wireless communication system as described above, wherein it is so arranged that said wireless node, after having reserved said timeslot, performs processing for transmitting said packet from a foremost position of timeslots in communication in said next active period.

With the arrangement as described above, the communication can be preferentially performed by the wireless node, which has reserved the timeslot.

Further, in addition to the arrangement as described above, the present invention provides the wireless communication system as described above, wherein it is so arranged that, in case a packet including a request of reservation of said timeslot is received from other wireless node, said wireless node avoids said timeslot requested reservation by said other wireless node and selects the timeslot for data transmission.

With the arrangement as described above, a packet to declare the reservation of the timeslot is notified to the other nodes in the neighborhood, and the notified node can refrain from using the timeslot, which is already reserved.

Also, in addition to the arrangement as described above, the present invention provides the wireless communication system as described above, wherein it is so arranged that, in case a packet including a request of reservation of said timeslot is not received from other wireless node, said wireless node searches a timeslot where data transmission can be performed so that said data transmission may not collide with data transmission by said other wireless node.

With the arrangement as described above, the wireless node, which did not receive a packet to declare the reservation of the timeslot, can transmit the data by searching the timeslot for its own data transmission.

Similarly to the wireless communication system as described above, the present invention also provides a communication control method and a communication node.

The present invention provides such effects that the starting of wireless units (transmitter/receiver) of each wireless node can be controlled for the purpose of reducing power consumption, and efficient access control in transmission route can be achieved. Also, according to the present invention, by the frame transmitted by each of the wireless nodes, which are synchronized, the wireless nodes to receive the frame can be synchronized with the active period. As a result, it is also possible to synchronize the wireless node, which cannot directly receive the frame from the basis node and to apply and to extend the wireless communication system to a wider area. The present invention also have the effects that, when data exchange is carried out between a multiple of nodes, for which the schedules of the active periods and the inactive periods of the wireless units are synchronized, by maintaining the chance to perform data transmission in advance over a plurality of starting periods, it is possible to avoid collision of transmission with the other nodes over a plurality of active periods on the data transmission and to reduce power consumption by maintaining the inactive period of the wireless units.

BRIEF DESCRIPTION OF THE DRAWINGS

FIG. 13 is a table to show an example of a packet format in the second embodiment of the invention.

FIG. 14 is a drawing to show an example of a data receiving table, which is held by each node for the purpose of controlling the conditions of slot reservation by other node in the second embodiment of the invention;

FIG. 15 is a table to show transition of the data receiving table in a specific node when communication as shown in FIG. 12 is performed;

BEST MODE FOR CARRYING OUT THE INVENTION

Description will be given below on a first embodiment and a second embodiment of the present invention by referring to the attached drawings.

The First Embodiment

Figure 1:
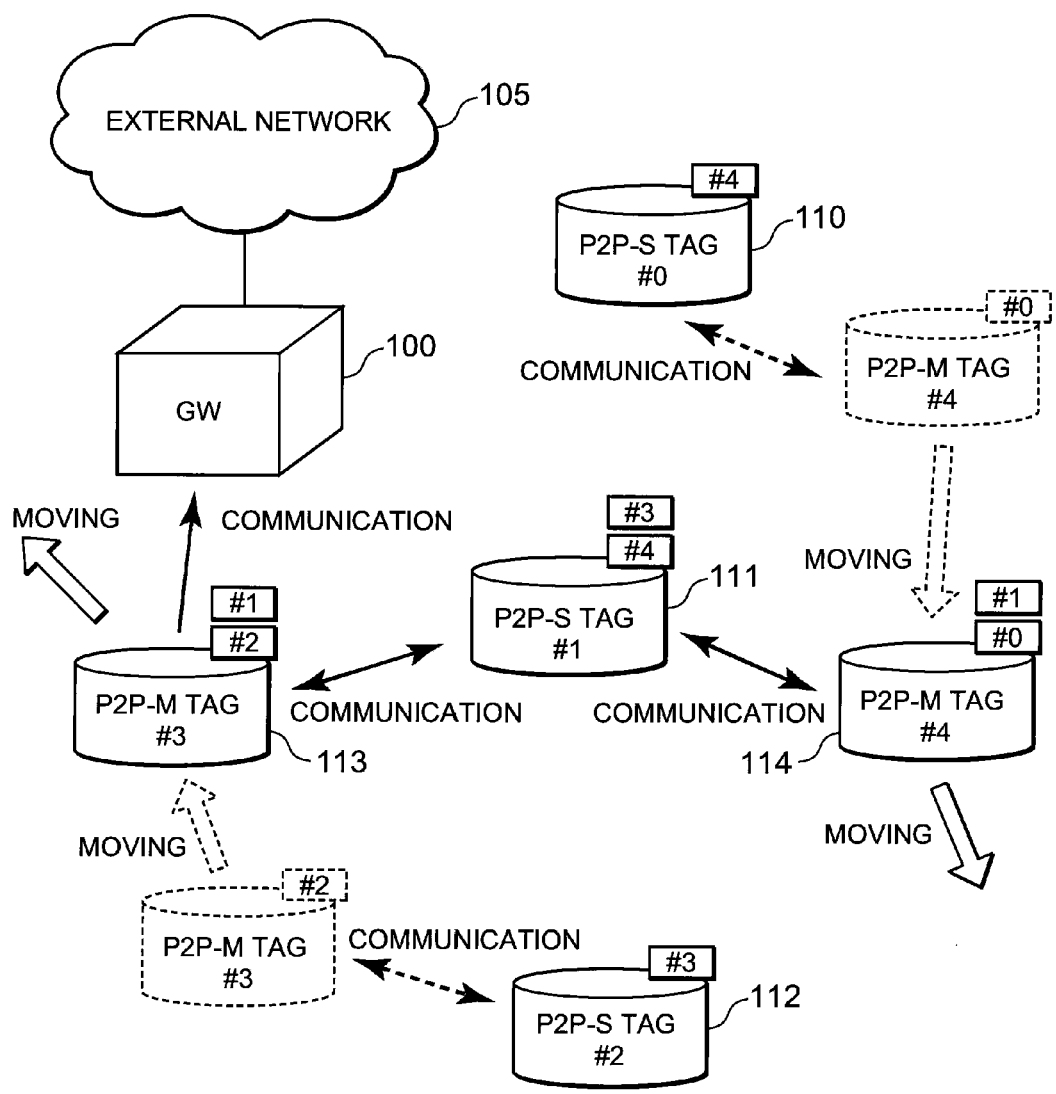
FIG. 1 is a schematical drawing to show an example of a communication system comprising wireless nodes of different types in a first embodiment of the invention.

First, referring to FIG. 1, description will be given on a communication system, which comprises wireless nodes of different types in the first embodiment of the invention. FIG. 1 is a schematical drawing to show an example of a communication system, which comprises wireless nodes of different types in the first embodiment of the invention.

The communication system shown in FIG. 1 comprises a gateway (GW) 100 and a plurality of wireless nodes (wireless tags) 110 to 114. GW 100 is connected to an external network (e.g. Internet) 105 via wired/wireless means, and it is a communication node, which can communicate with the external network 105. It is desirable that GW 100 is fixed at a position where the power required for operation can be supplied via a given wiring.

On the other hand, each of the wireless tags 110 to 114 is a small-type wireless tag (an active electronic tag) driven by battery, and it is a communication node, which can transmit and receive frames and which can give and take the data bi-directionally. Hereinafter, the wireless tag is referred as P2P tag. There are two types of P2P tags: P2P-S tag, which is not supposed to be mobile after installation (i.e. P2P tag fixedly set), and P2P-M tag, which is a P2P tag held and moved by a person.

As shown in FIG. 1, each of the P2P tags exchanges ad hoc its own ID (identification information) with a P2P tag, which is within a communicable range. By exchanging ID with each other and accumulating ID by the mobile P2P-M tag, mutual contact history can be maintained. As a result, a behavior history of a person (a history of identification information of the P2P-S tag, which is present at a position where the P2P-M tag contacts) and a transit history of a person at a point where the P2P tag is present (a history of identification information of the P2P-M tag, which passes through the communicable range of the P2P-S tag) are stored in P2P-M tag.

FIG. 1 shows three P2P-S tags (i.e. a P2P-S tag 110 (identification information "#0"), a P2P-S tag 111 (identification information "#1") and a P2P-S tag 112 (identification information "#2"), and two P2P-M-tags (i.e. a P2P-M tag 113 (identification information "#3") and a P2P-M tag 114 (identification information "#4"). Also, FIG. 1 shows how the P2P-M tag 113 (identification information "#3") moves in the communicable range of the P2P-S tag 112 (identification information "#2") and the P2P-S tag 111 (identification information "#1") and is connected to GW 100. Further, FIG. 1 shows how the P2P-M tag 114 (identification information "#4") moves in the communicable range of the P2P-S tag 110 (identification information "#0") and the P2P-S tag 111 (identification information "#1").

As a result, the identification information "#4" is recorded on the P2P-S tag 110. Similarly, the identification information "#3" and the identification information "#4" are recorded on the P2P-S tag 111, the identification information "#3" is recorded on the P2P-S tag 112, the identification information "#2" and the identification information "#1" are recorded on the P2P-M tag 113, and the identification information "#0" and the identification information "#0" and the identification information "#1" are recorded on the P2P-M tag 114.

The examples of actual application of the communication system as shown in FIG. 1 are, for example: acquisition of behavior of a person in the town, and acquisition of contact history, etc. In this case, by setting GW 100 at a position where power supply can be ensured and by arranging a multiple of P2P-S tags at other positions, it is possible to acquire the behavior history and the contact history of a person, who has the P2P-M tag. In the application as given above where own ID is simply exchanged by wireless node (P2P tag) and the contact history is left there, the information transmitting side has no need to identify the receiving side. It would suffice if each P2P tag broadcasts its own ID, and a P2P tag, which has received this ID, stores the received ID.

Figure 2:
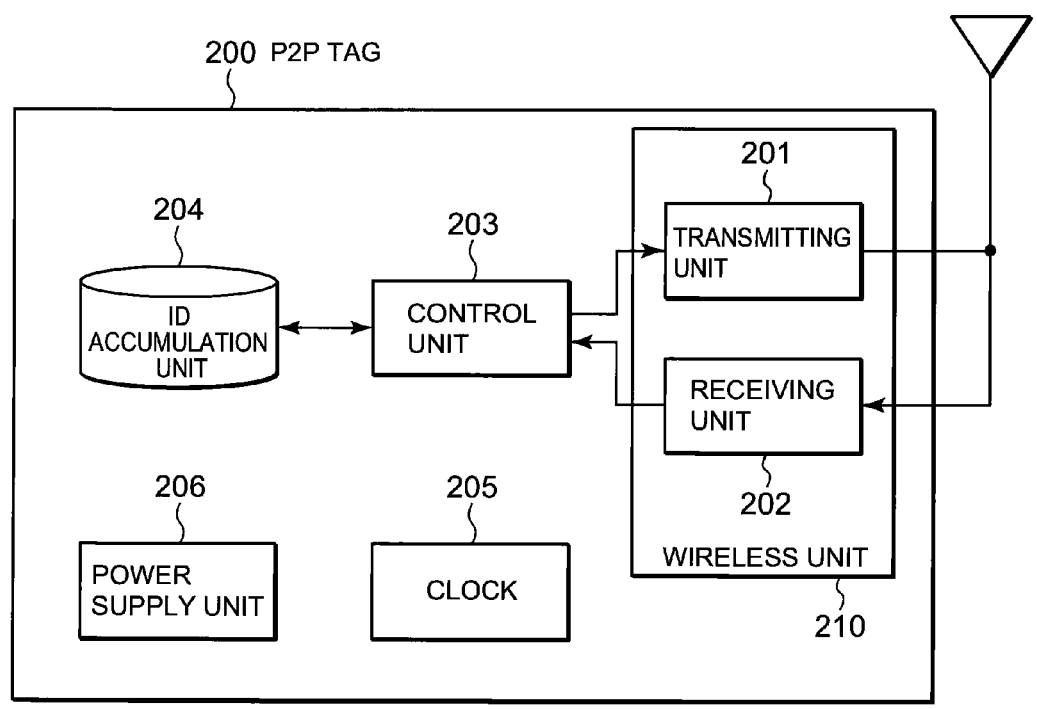
FIG. 2 is a block diagram to show an example of a configuration of P2P tag in the first embodiment of the invention.

Next, referring to FIG. 2, description will be given on the function of the P2P tag in the first embodiment of the invention. FIG. 2 is a block diagram to show an example of configuration of the P2P tag in the first embodiment of the invention. Each function of the P2P tag is shown by block, while the function represented by each block can be fulfilled by hardware and/or software.

A P2P tag 200 shown in FIG. 2 comprises a wireless unit (radio communication unit) 210 having a transmitting unit 201 and a receiving unit 202, a control unit 203, an ID accumulation unit 204, a clock 205, and a power supply unit 206.

The transmitting unit 201 has a function to transmit a frame including its own ID to outside via wireless means. As described above, ID transmission at the transmitting unit 201 is carried out by broadcasting. Also, the receiving unit 202 has a function to receive a frame including an ID, which is transmitted by the other P2P tag or GW.

The control unit 203 has a function to control behavior of this P2P tag 200. The control unit 203 has a function, for instance, to control timing of ID transmission at the transmitting unit 201 according to a clock signal obtained from a clock 205. Also, the control unit 203 has a function to accumulate ID of other P2P tag, received at the receiving unit 202, in the ID accumulation unit 204. Further, the control unit 203 also has a function to control the operation shown in FIG. 7A, FIG. 7B and FIG. 8 as given later.

In case the P2P tag 200 is a P2P-S tag, the control unit 203 basically controls in such manner that only the frame received from P2P-M tag is recorded. On the other hand, if the P2P tag 200 is a P2P-M tag, the control unit 203 basically controls so that the frames received from GW, P2P-S and P2P-M are recorded without discrimination.

The ID accumulation unit 204 has a function to accumulate IDs of other P2P tags received at the receiving unit 202. When IDs are accumulated at the ID accumulation unit 204, time information at the moment may be recorded together with IDs.

The clock 205 has a function to output a clock signal to specify the timing of frame transmission at the transmitting unit 201 or the timing of the receiving of the frame at the receiving unit 202. The power supply unit 206 is a power source incorporated in the P2P tag 200 so that the P2P tag can move to any arbitrary place. For instance, it is a battery mounted in a cubicle (housing) of the P2P tag 200.

Figure 3:
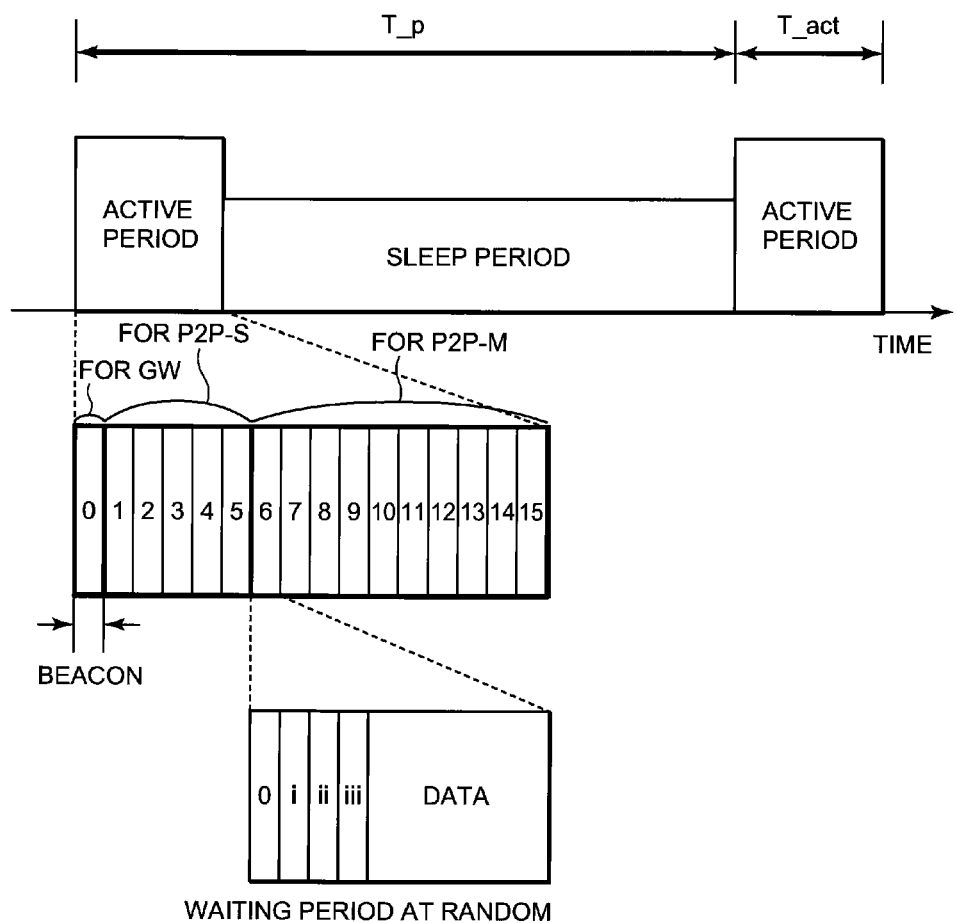
FIG. 3 is a schematical drawing to show an example of a timeslot configuration in the first embodiment of the invention.

Next, referring to FIG. 3, description will be given on a timeslot configuration in the first embodiment of the invention. FIG. 3 is a drawing to show an example of a timeslot configuration in the first embodiment of the invention.

In the first embodiment of the invention, as shown in FIG. 3, an active period (T_act) and a sleep period of the wireless unit are defined for the purpose of achieving the reduction of power consumption, and it is so designed that the active period is repeated at a given cycle (beacon cycle) (T_p).

Further, the active period consists of a plurality of timeslots. In the first embodiment of the invention, the first timeslot of the active period is defined as a basis timeslot (In FIG. 3, it is described as: "(a timeslot) for GW"), and this basis timeslot is used by GW. GW fulfills the function as a basis node. When the frame is first' transmitted from GW at the beginning of the active period of a given cycle, a P2P tag, which has received this frame, can synchronize the active period. As described above, GW can operate under the condition where power supply is ensured, and the frame to be used as an index for synchronization can be reliably transmitted from GW. However, according to the present invention, so far as the frame used by the basis node is defined within the system, it is not necessarily the first timeslot of the active period.

The other timeslots within the active period are set up by dividing as follows: a timeslot for transmitting the frame of P2P-S tag (hereinafter, referred as "slot for P2P-S)"), and a timeslot for transmitting the frame of P2P-M tag (hereinafter, referred as "slot for P2P-M"). The method to distribute the timeslots to each of the P2P M-tags and the P2P-S tags and the number of distributions of the timeslots can be defined arbitrarily, depending on the system configuration and the setting of the system.

FIG. 3 shows an example where, subsequent to the first timeslot (basis timeslot) of the active period, 5 slots for transmitting the frames of the P2P-S tag are assigned (in FIG. 3, it is referred as "for P2P-S"), and subsequently, 10 slots are assigned as the timeslots for transmitting the frames of the P2P-M tag (In FIG. 3, it is given as: "for P2P-M"). In the example of the timeslot configuration as shown in FIG. 3, each timeslot has a fixed length, and it is assumed that each P2P tag has a size (period) enough to transmit the frames to be exchanged. Also, a waiting period (unit waiting period×"n" (integral number)) to determine a point to start the transmission of frames at the slot is defined. In FIG. 3, four transmission points are shown (the number "n" of the waiting period is defined at random in numerical value of 0 to 3). The decision as to which transmission point is used as a point to transmit the frame (i.e. how the waiting period is determined) is defined at random for each node, which transmits the frame to each slot. The maximum value of "n" and the unit waiting period are determined arbitrarily, depending on the configuration and the setting of the system.

Figure 4:
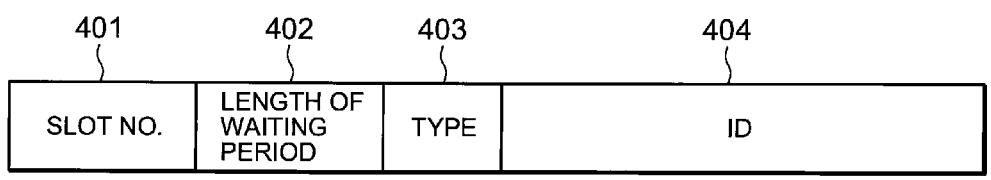
FIG. 4 is a drawing to show an example of a configuration of a frame to be transmitted by each P2P tag in the first embodiment of the invention.

Next, referring to FIG. 4, description will be given on the configuration of the frame to be transmitted by each P2P tag in the first embodiment of the invention. FIG. 4 shows an example of a configuration of a frame to be transmitted by each P2P tag in the first embodiment of the invention.

As shown in FIG. 4, the following are included in the frame to be transmitted by P2P tag in addition to an ID field 404 where IDs of P2P tags are stored: a slot number field 401 for storing the slot number to be transmitted by the P2P tag, and a waiting period length field 402 where the length of the waiting period (the integral number "n" as given above) in each slot are stored. By this length of the waiting period, it is possible to identify at which timing of the timeslot the frame has been transmitted.

Upon receipt of the frame having the format as shown in FIG. 4, the P2P tag can synchronize the active period according to the timing of the receiving and to information on the slot number of the length of the waiting period contained in the received frame. That is, according to this frame configuration, it is possible to synchronize the active period based on the data in an arbitrary frame received (a frame received from an arbitrary transmission source at arbitrary timing). Also, a type field 403 is contained in the frame. In the type field 403, type information to indicate the type of the node, which transmitted the frame, is stored. For instance, GW, P2P-S tag, and P2P-M tag are differentiated from each other by the type information.

Figure 7A:
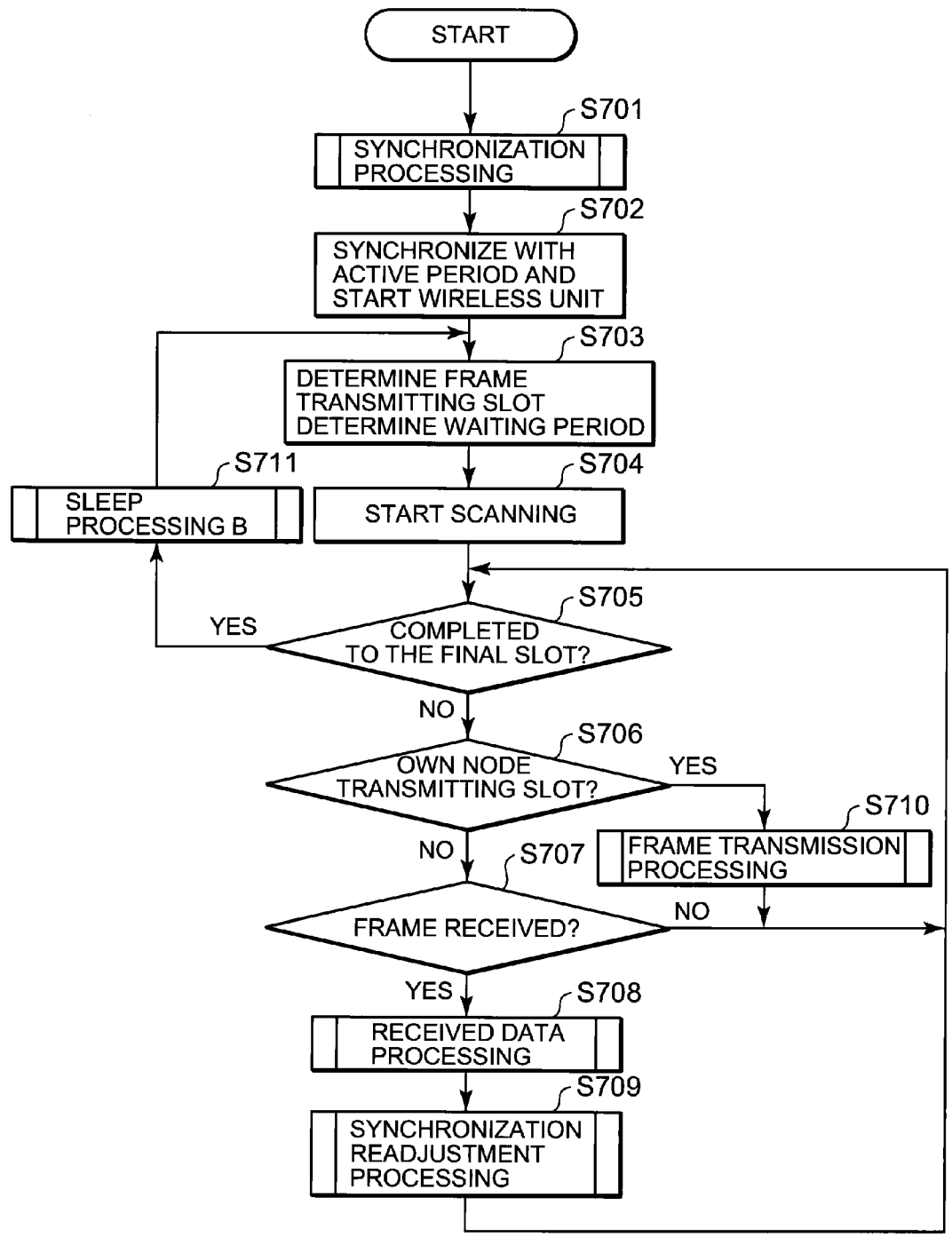
FIG. 7A is a flow chart to show an example of behavior of a P2P-S tag in the first embodiment of the invention.

Next, referring to FIG. 7A and FIG. 7B, description will be given on actual operation of the P2P-S tag. FIG. 7A is a flow chart to show an example of operation of the P2P-S tag in the first embodiment of the invention, and FIG. 7B is a flow chart to show an example of synchronization processing in Step S701 of FIG. 7A.

In FIG. 7A, when the P2P-S tag is started, synchronization processing is performed (Step S701). Referring to FIG. 7B, description will be given below on detailed operation of the synchronization processing in Step S701.

Figure 7B:
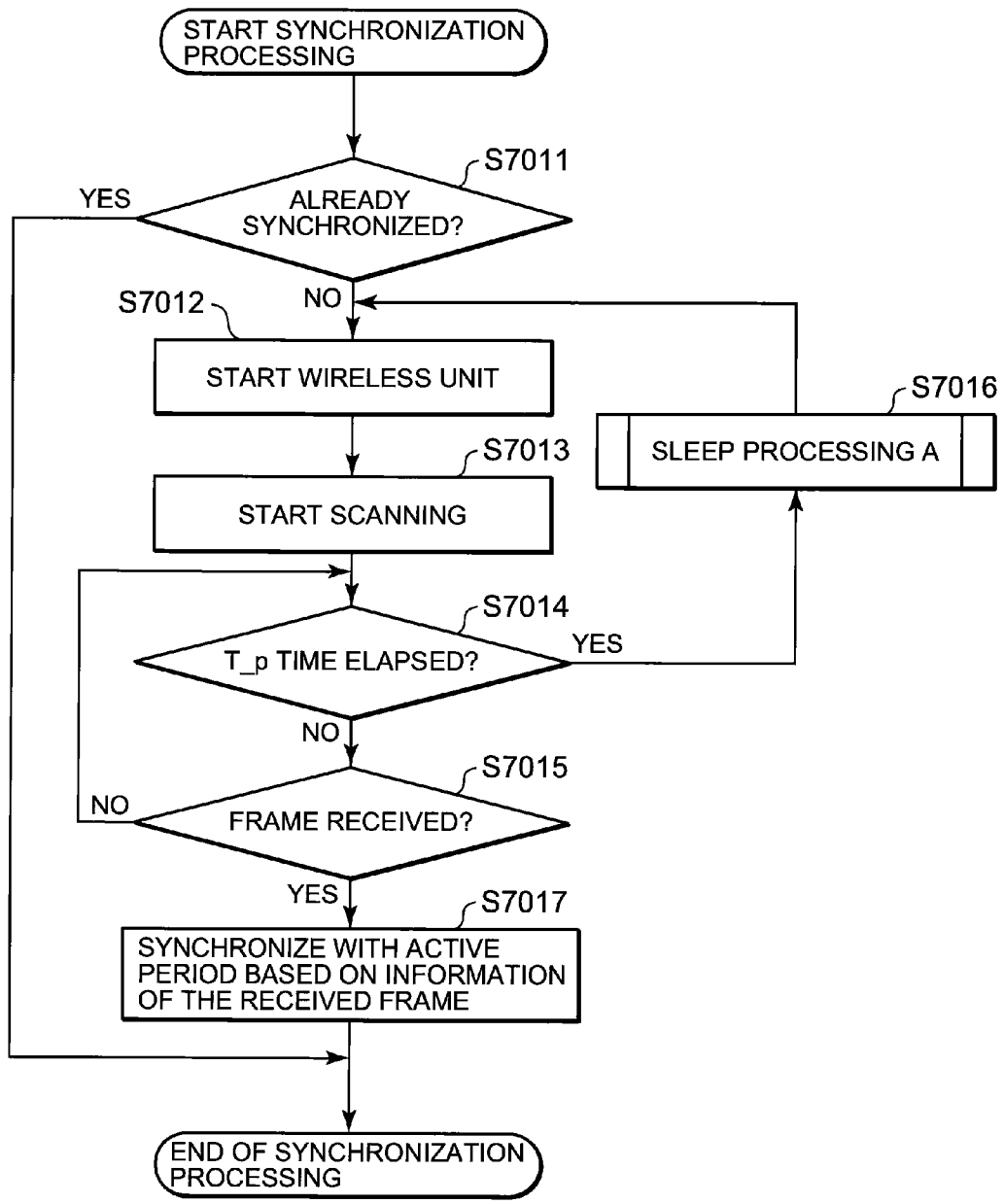
FIG. 7B is a flow chart to show an example of synchronization processing in Step S701 in FIG. 7A.

In FIG. 7B, the P2P-S tag judges whether the tag itself is synchronized with the active period or not (Step S7011). For instance, it is configured that, when the P2P-S tag is synchronized, the P2P-S tag indicates it by a flag that it is in synchronized state. In Step S7011, this flag is referred and it is judged whether it is in synchronized state or not.

If it is immediately after the starting, it is naturally not synchronized yet, and the processing for non-synchronized state is started. In this case, the P2P-S tag starts the wireless unit 210 so that the tag itself can transmit and receive the frame (Step S7012). Then, scanning is started (Step S7013). The present invention is not specifically limited to wireless frequency and channel used for communication. In the first embodiment of the invention, the P2P-S tag performs scanning on the channel, which is set to be used in a communication system.

In case not a single frame has been received after the elapse of time T_p (one beacon cycle) from the start of the scanning in Steps S7014 and S7015, it means that there is no P2P tag or no GW, which is transmitting the frame in the neighborhood of the P2P-S tag (i.e. within an area where the P2P-S tag can receive the frame). In this case, the P2P-S tag moves to the state of sleep processing A (Step S7016). In the sleep processing A, P2P-S tag calculates the time (the cycle period T_p×integral number), which is a value obtained through multiplication by integral number at random based on one beacon cycle T_p, for instance. By stopping the operation of the wireless unit 210 for the period of time as calculated, power consumption can be reduced.

On the other hand, when the frame is received prior to the elapse of one beacon cycle T_p from the start of the scanning in Steps S7014 and S7015, the P2P-S tag immediately performs the synchronization of the active period according to the information of the received frame (Step S7017). The frame can be transmitted only by GW and the P2P tag, which is synchronized. At the moment when the frame has been received, the P2P-S tag can calculate the start of the active period (start timing) from the slot number of the frame and the length of the waiting period. It is desirable that the P2P-S tag does not perform synchronization processing based on the frame received from the P2P-M tag. Specifically, the P2P-S tag refers to the type field 403 of the received frame, and it is desirable that, only in case this frame is a frame transmitted from GW or P2P-S tag, the start timing of the active period based on the frame is calculated.

By the synchronization processing (the processing of Steps S7011 to S7017 shown in FIG. 7B) in the Step S701 as given above, the P2P-S tag, which is turned to a state where synchronization with the active period is performed (synchronized state), is synchronized with the active period as shown in FIG. 7A and starts the wireless unit 210 for transmitting and receiving the frame (Step S702).

Further, the P2P-S tag decides a timeslot at the same time so that the tag itself can transmit the frame (a frame transmission slot) (Step S703). The decision of the frame transmission slot is simply the selection at random of the timeslot to perform frame transmission within own node. In this case, however, each P2P tag must select a frame transmission slot from the timeslots assigned to the type of the P2P tag such as the selection of the slot for P2P-S (e.g. selection of 5 slots subsequent to the basis timeslot in the active period in the example shown in FIG. 3) in case of the P2P-S tag. Also, in Step S703, the P2P-tag decides at random the waiting period similarly to the selection of the frame transmission slot and adjusts the transmission timing at the selected frame transmission slot.

Then, the P2P-S tag starts scanning from the basis timeslot of the active period (Step S704). In this case, the P2P-S tag starts the wireless unit 201 and performs normal scanning processing until the tag itself is turned to a timeslot to perform the frame transmission (Steps S705 to S707).

When a frame has been received in this scanning processing, the P2P-S tag performs the processing of the received data as to be described later (Step S708) and carries out readjustment processing for synchronization (Step S709). Also, when it is the timing of the timeslot to transmit by itself, the P2P-S tag performs carrier sense after waiting for the length of the waiting period as decided, and after confirming that the timeslot is in non-used state (idle state), it transmits its own frame (Step S710).

In the frames to be transmitted in Step S710, the slot number of the frame (identification information of the timeslot to transmit the frame) and the length of the waiting period are included. In the timeslot selected at random at the time of transmission of the frame, collision avoidance processing by carrier sense is performed after shifting the transmission timing, depending on the waiting period. As a result, even when a plurality of P2P tags select the same timeslot as the frame transmission slot, the destruction of the frame due to useless collision can be avoided. Also, because the frame transmission slot is decided at random for each active period and it is not fixed, it is possible to flexibly cope with the situations such as the change of the number of P2P-S tags to be set.

In Step S7017 of FIG. 7B, the P2P-S tag can perform synchronization in the active period by receiving the frame, which has been transmitted by each of P2P-S tags already synchronized, in addition to the receiving of the frame from GW. Strictly speaking, in the synchronization processing of Step S7017, deviation may be caused, depending on the clock accuracy of each P2P-S tag. However, in the frame transmission of each P2P-S tag (frame transmission processing of Step S710 in FIG. 7A) is carried out after confirming idle state of transmission route based on the checking by the carrier sense. In the Carrier Sense Multiple Access with Collision Avoidance (CSMA/CA), the random feature of transmission timing is important for the purpose of effectively utilizing the transmission route by avoiding the collision of the transmitted frames. In this context, the deviation depending on clock accuracy of each P2P-S tag as described above has an effect to avoid the collision after the carrier sense, which may be caused in a perfectly synchronized system.

Although not shown in FIG. 7A, the P2P-S tag, which can receive the frame from GW at the basis timeslot as to be described later (see the P2P-S1 tag shown in FIG. 6), can stop the operation of the wireless unit 210 at the slot for the other P2P-S except the timeslot, which transmits the frame by itself.

Next, description will be given on the processing of the received data in Step S708 as given above. Basically, the P2P-S tag is so configured that it records only the frames received from the P2P-M tag. Specifically, in the processing of the received data at the P2P-S tag, the received data is not recorded in case the type field given in the received frame is not a P2P-M tag. On the other hand, in case the type field given in the received frame is a P2P-M tag, the received frame is recorded. However, when the frame is received again from the same P2P-M tag received during the previous active period, it is desirable that the P2P-S tag performs no processing on the received frame.

As described above, the reason why the frame received from GW or P2P-S tag is not recorded is that no change occurs due to the moving with regard to GW or P2P-S tag, which is fixedly set. In this way, if it is designed that a mobile history is not considered on the communication nodes (GW and P2P-S tag) without change, it is possible to avoid useless consumption of memory. Also, by the same reason, it may be so designed that power consumption caused by useless processing or useless consumption of memory can be avoided without recording the frames continuously.

Next, description will be given on the synchronization readjustment processing in Step S709 as given above. In the communication system in the first embodiment of the invention, except a P2P tag, which can directly receive the frame from GW, it is synchronized with the P2P tag based on the frame received from the P2P tag, which is directly or indirectly synchronized with GW. For this reason, if synchronization in the active period is not readjusted for long time, the accuracy of synchronization of the P2P tag located at a position remote from GW is decreased due to the deviation in clock accuracy of each P2P tag. In this sense, it is desirable that each P2P tag adequately readjusts the synchronization. For instance, each P2P tag may be so configured that it performs synchronization readjustment processing when the frame is received.

However, when each P2P tag can receive the frame at the basis timeslot (i.e. when the frame from GW can be received), it is desirable that synchronization readjustment processing is not conducted according to the received frame at the subsequent timeslots. When the frame is received at the slot for P2P-S tag, it is desirable that each P2P tag performs synchronization readjustment processing based on the timeslot, which received the frame first, and that synchronization readjustment processing based on the frames received at subsequent timeslots is not carried out.

When the frame cannot be received at the basis timeslot and at the slot for P2P-S, even when it is the case where the frame is received at the slot for P2P-M, it is desirable that each P2P tag does not perform synchronization readjustment processing based on the received frame. This is because, in case of the P2P-M tag, it may have been present at a position where the frame cannot be received from any of the communication nodes and because it is not adequate to use the P2P-M tag as a basis for synchronization readjustment.

When the synchronization readjustment processing is as described above is completed, for the purpose of recording and holding the data in the information relating to the P2P-M tag, the P2P-S tag can stop the operation of the wireless unit 210 until it comes to the timing of the next P2P-M slot (slot for P2P-M) at the slot for other P2P-S tag except the timeslot, which transmits the frame by itself. When the final slot for P2P-M tag is received and the active period is terminated, the P2PS tag performs the sleep processing B (Step S711). In this sleep processing B, the P2P-S tag turns off the wireless unit 210 for transmitting and receiving the frame for the remaining time of one beacon cycle, and this contributes to the reduction of power consumption.

Figure 8:
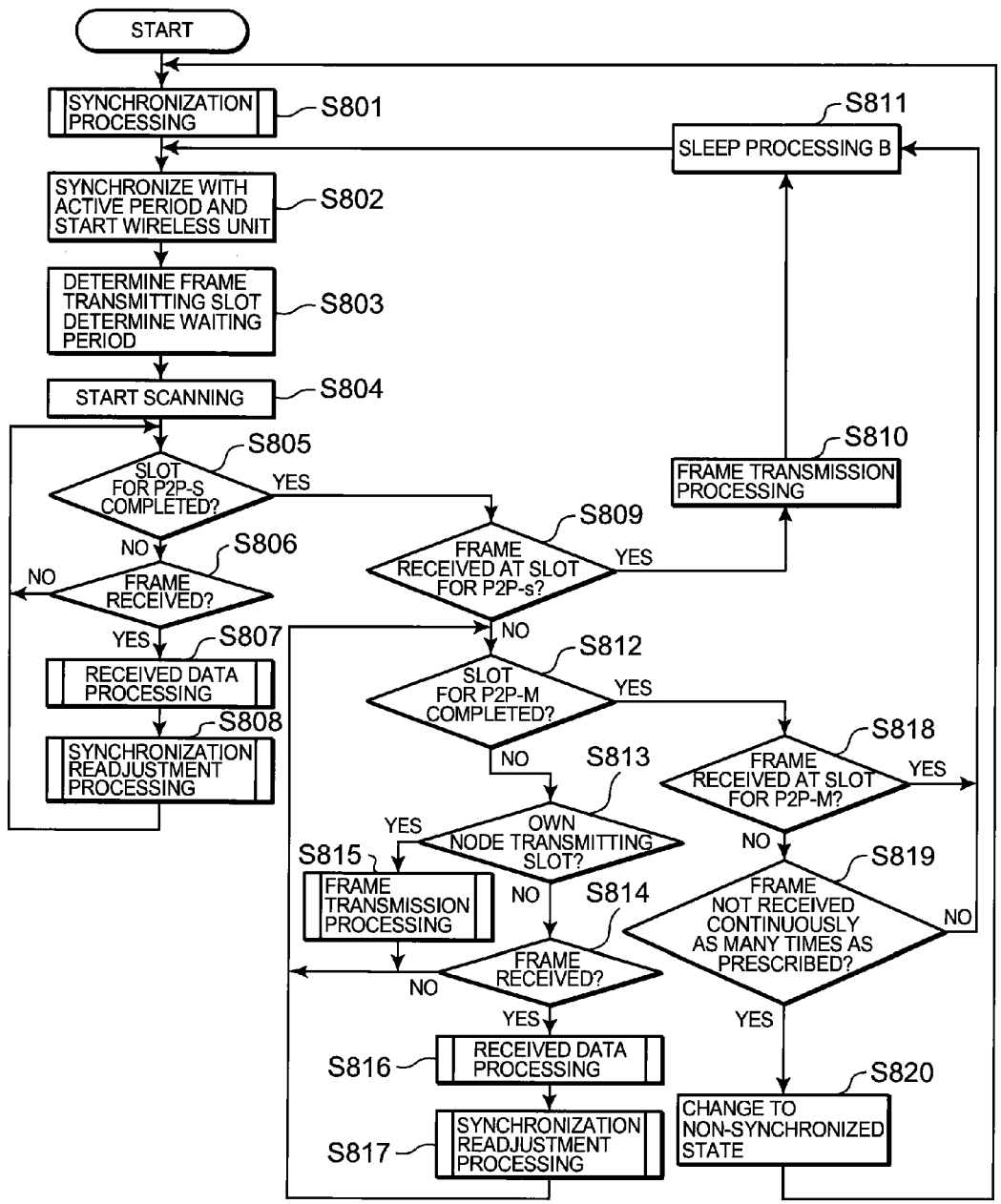
FIG. 8 is a flow chart to show an example of behavior of P2P-M tag in the first embodiment of the invention.

Next, referring to FIG. 8, description will be given on the processing of the P2P-M tag. FIG. 8 is a flow chart to show an example of behavior of the P2P-M tag in the first embodiment of the invention. The difference between the P2P-M tag and the P2P-S tag is that P2P-S tag does not move after the setting while P2P-M tag moves. Once it is synchronized, the P2P-S tag can keep synchronization by the synchronization readjusting processing. In case of the P2P-M tag, it moves to a position where it is not possible to have communication with GW or other P2P tag, and it may not be possible to perform synchronization readjustment processing based on the frame received from GW or other P2P tag. In this case, the P2P-M tag may cause synchronization deviation of the active period. For this reason, the P2P-M tag performs the processing partially different from that of the 2P-S tag.

In FIG. 8, when the P2P-M tag is started, similarly to the case of the P2P-S tag, it is judged whether it is synchronized by itself or not, and if it is not synchronized, synchronization is performed (Step S801). In the synchronization processing of Step S801, a processing basically the same as the synchronization processing shown in FIG. 7B is carried out. Specifically, if it is not synchronized yet, the P2P-M tag starts the wireless unit 210, and scanning is performed for a period of T_p, which is the beacon cycle. If the frame is received during this period, synchronization processing based on the received frame is performed. This is because, unlike the case of the P2P-S tag, P2P-M tag moves by itself, and even when it is synchronized with the P2P-M tag, and the frame is directly received from GW or P2P-S tag in the subsequent mobile behavior and it is possible that the synchronization processing is conducted according to the received frame.

When it is in synchronized state in the active period, similarly to the P2P-S tag as described above, P2P-M tag starts the wireless unit 210 for performing the transmission and the receiving of the frame in synchronization with the active period (Step S802). At the same time, it decides the slot, by which the P2P-M tag can transmit the frame itself and also decides the waiting period (Step S803). Then, scanning is performed on the basis timeslot in the active period and on the slot for P2P-S (Steps S804 and S805). Here, if the frame is received at the slot for P2P-S (Step S806), the P2P-M tag performs the processing on the received data and the synchronization readjustment processing similarly to the case of the P2P-S tag as described above (Steps S807 and S808).

When the procedure at the slot for P2P-S is completed, the processing of P2P-M tag is performed in two different ways: i.e. the processing in the case when the frame is received and the processing in the case when the frame is not received (i.e. at the basis timeslot and at the slot for P2P-S) (Step S809).

When the frame is received at the slot for P2P-S (and at the basis timeslot), the P2P-M tag does not carry out the receiving processing on the subsequent slot for P2P-M. In case the node not received previously is included in the transmission node (GW or P2P-S tag) of the received frame, the P2P-M tag carries out only the processing on the received frame at its own transmission slot determined in advance (Step S810). The frame transmission processing is the same as in the case of the P2P-S tag (e.g. the same processing as that of the processing of Step S710 in FIG. 7A). In case the node not received previously is not included in the node, which transmitted the received frame, or in case it is after the frame transmission processing of Step S810, the P2P-M tag proceeds to the sleep processing B, in which the wireless unit 210 to transmit and receive the frame is turned off (Step S811).

On the other hand, in case the frame is not received until the completion of the procedure at the slot for P2P-S, the P2P-M tag continues to perform the frame receiving processing even at the slot for P2P-M (Step S812). In case it has a frame to be transmitted, the P2P-M tag performs the frame transmission processing (Step S815) when it comes to the selected frame transmission slot where it is to carry out the frame transmission selected by itself (Step S813). Also, when the frame is received at the slot for P2P-M (Step S814), the P2P-M tag carries out the data processing on the received frame and the synchronization readjustment processing (Steps S816 and S817).

When the procedure at the slot for P2P-M is completed, all timeslots in the active period are terminated. If the fame is not received at all of the timeslots in the active period, this means that it is the cases (1) and (2) or the cases (1) and (3) as given below:

(1) The P2P-M tag is located at a position where it is not possible to receive from GW and P2P-S tag;

(2) The P2P-M tag is located at a position where the frame cannot be received from other P2P-M tag, which receives the frame and detects the receiving of the P2P-S tag not received previously; or (3) Another P2P-M tag located at a position where it can communicate with an arbitrary P2P-S tag, but this another P2P-M tag does not detect the P2P-S tag not received previously because it is not moved, for instance. Also, because this another P2P-M tag does not transmit the frame, the P2P-M tag cannot receive the frame from this another P2P-M tag.

As described above, even in case another P2P-M tag is present within the communicable range (i.e. the case of (3) above), there may a case where the P2P-M tag may not receive the frame from this another P2P-M tag. Therefore, even in case where the frame is not received up to the completion of the slot for P2P-M in Step S818, it is judged promptly that the synchronization has gone off and it is shifted to the sleep processing B without performing synchronization readjustment as many times as prescribed similarly to the other cases (Step S819).

On the other hand, in case the frames are not received continuously as many times as prescribed in the active period, the P2P-M tag judges that the synchronization is gone off and sets a flag, which indicates whether it is in synchronized state or not, and it is designated that it is in non-synchronized state (Step S820). As a result, it is shifted again to the synchronization processing in Step S801, and the synchronization with the active period is carried out. By carrying out the scanning for one beacon cycle, the P2P-M tag, which has been gone off from the synchronization and was not able to receive the frame transmitted during the active period, can return to normal behavior through re-synchronization when the active period is terminated, and it is shifted to the sleep processing B of Step S811. Then, it is turned to the sleeping state for the period except the active period.

In the processing of the received data at the P2P-M tag, the P2P-M tag is basically so configured that it records the frames received from GW, P2P-S and P2P-M without discrimination. However, when the frames have been received from the same GW, P2P-S tag and P2P-M tag during the previous active period, the P2P-M tag performs no processing on the received frames.

Figure 5:
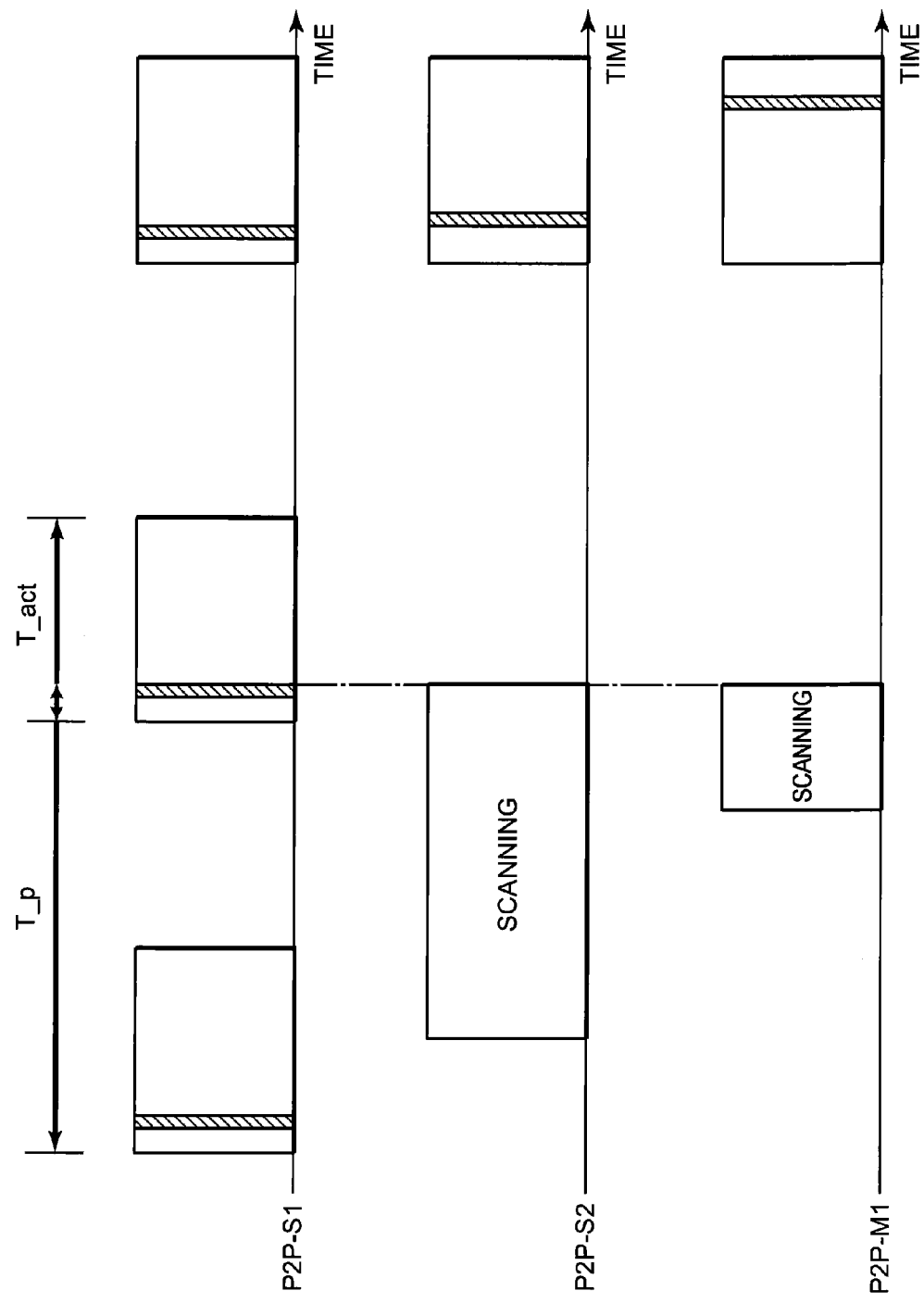
FIG. 5 is a timing chart to represent an example of timing for transmission and receiving of frame of each node in the communication system of the first embodiment of the invention.

Next, referring to FIG. 5, description will be given on the frame transmission and receiving timing of each node of the communication system in the first embodiment of the invention. FIG. 5 is a timing chart to show an example of frame transmission and receiving timing of each node in the communication system of the first embodiment of the invention. FIG. 5 shows the frame transmission and receiving timing in the two cases respectively: the case of two P2P-S tags (P2P-S1 tag and P2P-S2 tag) and the case of one P2P-M tag (P2P-M1 tag).

FIG. 5 shows the timing of the synchronization, taken by the P2P-S2 tag and the P2P-M1 tag not yet synchronized, with respect to the P2P-S1 tag, which has received the frame from GW and for which synchronization adjustment has already been performed.

The P2P-S2 tag and the P2P-M1 tag perform the scanning respectively. The state where this scanning is performed corresponds to a case of starting for P2P-S tag or to a case where it is not synchronized and is moved while performing the scanning for synchronization. In FIG. 5, the shaded portion indicates that each tag is receiving the frame. In FIG. 5, only the frame transmission timing is indicated by the shaded portion, and the frame receiving timing is not shown. Each of the P2P-S2 tag and the P2P-M1 tag stops the scanning at the moment when the frame of P2P-S1 tag has been received. The synchronization processing based on the frame received from the P2P-S1 tag is performed. Then, it is synchronized with the next active period, and the wireless unit 210 is started. Because the scanning can be stopped at the moment of synchronization, there is no need to continuously maintain the wireless unit 210 at the starting state during one beacon cycle.

Figure 6:
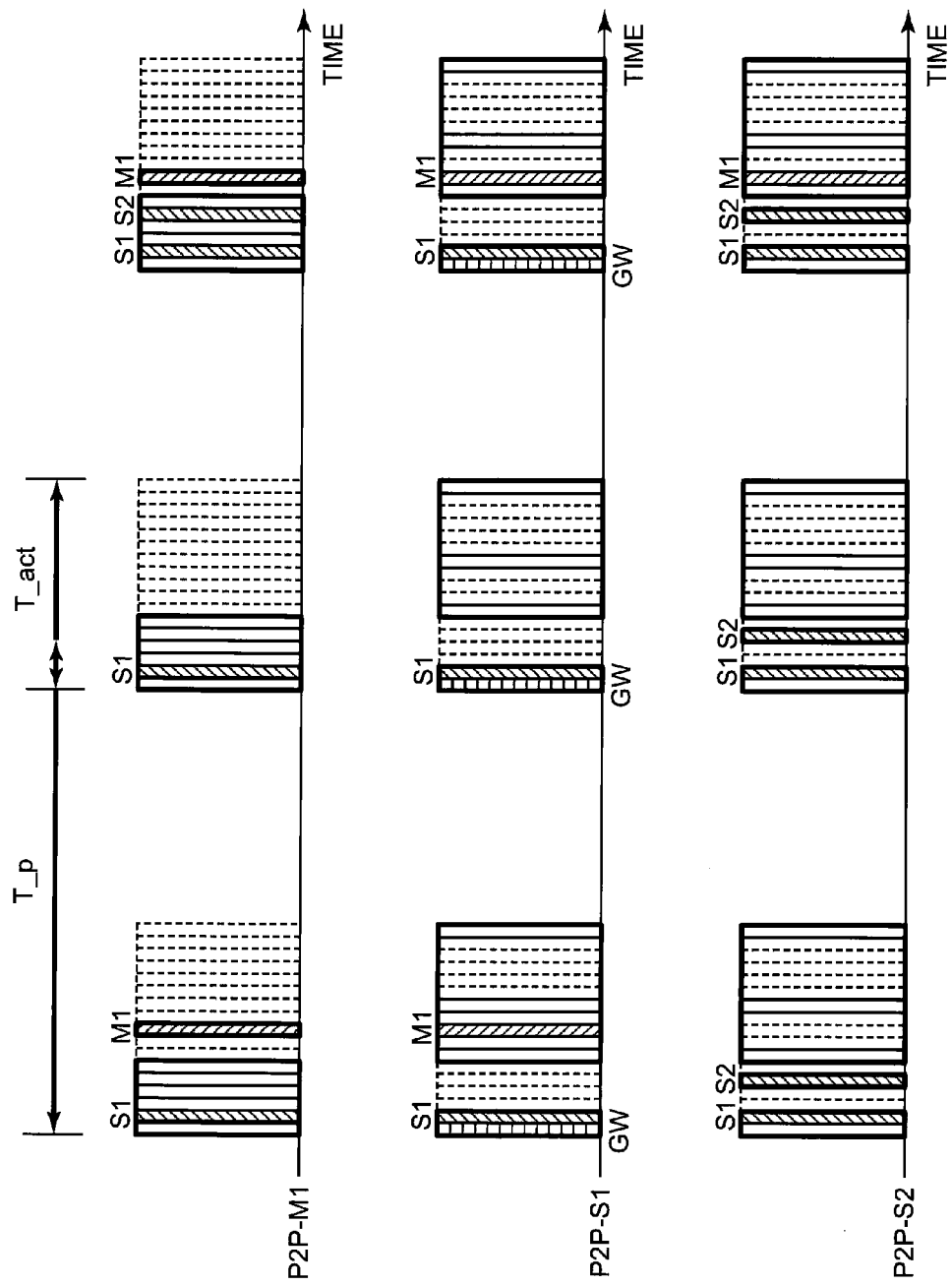
FIG. 6 is a timing chart to show another example of the timing of frame transmission and receiving of each node in the communication system of the first embodiment of the invention.

FIG. 6 is a timing chart to show one example of frame transmission and receiving timing of each node in the communication system of the first embodiment of the invention. FIG. 6 is a schematical drawing to show operation of frame transmission and receiving between P2P tags after all of P2P tags have been synchronized under the condition shown in FIG. 5. In FIG. 6, each of the symbols "GW", "S1", "S2" and "M1" added to the slots means that each of GW, P2P-S1, P2P-S2 and P2P-M1 is the timeslot to be used in the frame transmission respectively, and each of the frames "GW", "S1", "S2" and "S2" means that it is the frame to be transmitted at each timeslot. The portion indicated by thick lines in each timeslot shown in FIG. 6 is a period, during which each P2P tag turns the wireless unit 210 on. In the other period, each P2P tag turns off the wireless unit 210 to reduce power consumption.

In FIG. 6, the P2P-S1 tag has received the frame "GW" and it is synchronized. The P2P-S2 tag has received the frame "S1" from the P2P-S1 tag and it is synchronized. Also, the P2P-M1 tag first receives the frame of the P2P-S1 tag after moving, and it is moving in the direction of the P2P-S2 tag.

In FIG. 6, in the frame transmission and receiving of each P2P tag during the first active period, only the P2P-S1 tag receives the frame "GW" at the first slot. This is because only the P2P-S1 tag can communicate with GW. Because the P2P-S1 tag can perform synchronization readjustment processing based on the frame received from GW, the P2P S1 tag may stop the wireless unit 210 except the time when it transmits the frame by itself to reduce power consumption at the subsequent slots for P2P-S as shown in FIG. 6.

The frame "S1" transmitted by the P2P-S1 tag is received by the P2P-M1 tag and the P2P-S2 tag. Both of the P2P-M1 tag and the P2P-S2 tag perform the synchronization readjustment processing according to the frame "S1" of the P2P-S1 tag. On the other hand, the P2P-S2 tag transmits the frame "S2" at its own frame transmission timing. However, the frame "S2" transmitted from the P2P-S2 tag has not reached the P2P-M1 tag yet. Because the P2P-S1 tag is stopping the wireless unit 210 after the transmission of the frame "S1", it does not receive the frame from the P2P-S2 tag.

On the other hand, the P2P-M1 tag records the P2P-S1 tag because the frame "S1" is the first received frame. After the receiving of the frame at the slot for P2P-S has been completed, the P2P-M1 tag transmits own frame at the timeslot selected by itself of the slot for P2P-M. Because the P2P-M1 tag has received the frame at the slot for P2P-S, it does not perform the receiving processing with respect to the slot for P2P-M. In case the P2P-M1 tag transmits the frame "M1" to the slot for P2P-M selected by itself, the P2P-S1 tag located within the communicable range receives this frame. At this moment, ID of the P2P-M1 tag is recorded on the P2P-S1 tag.

It is supposed here that the P2P-M1 tag does not move and continues to be present at the same position even during the next active period. In this case, similarly to the previous active period, the P2P-M1 tag receives the frame "S1". However, the frame "S1" is already received from the P2P-S1 tag in the previous active period, and it does not perform the transmission processing of its own frame and stops the operation of the wireless unit 210.

Further, it is supposed that the P2P-M1 tag moves in the next active period and it can perform communication with P2P-S2 tag. In this case, the P2P-M1 tag receives the frames from both of the P2P-S1 tag and the P2P-S2 tag. Because the received frame "S2" from P2P-S2 is a frame from the new P2P tag, which has not been received in the previous active period, ID of the P2P-S2 tag, which is the transmission source of the frame "S2", is recorded, and the frame "M1" is transmitted. The frame "M1" is received by both of the P2P-S1 tag and the P2P-S2 tag, which are present within the communicable range, and ID of the P2P-M1 tag is recorded by the P2P-S2 tag. In this case, the frame receiving may be additionally recorded together with the time of the frame receiving at the P2P-S1 tag, or the receiving of the frame from the same P2P tag may not be recorded if a certain fixed time period has not elapsed because the received frame from P2P-M1 is already recorded.

As described above, each of the P2P-S tag and the P2P-M tag can have the period to stop the wireless unit 210 at the timeslots during the active period, and power consumption can be reduced further. In the first embodiment of the present invention, description is given on a case where there is only one GW, which is the basis node, while it is not necessary that there is only one basis node within the same system in the first embodiment of the invention. If there is no node, which can communicate with a plurality of basis nodes at one time and if the plurality of basis nodes are synchronized in a manner different from the manner described in the present invention, a plurality of basis nodes may be used in the same system. For instance, a method for synchronization of the basis nodes may be used. According to this method, the basis nodes are synchronized by using an external network, to which the basis nodes are connected.

The Second Embodiment

Figure 9:
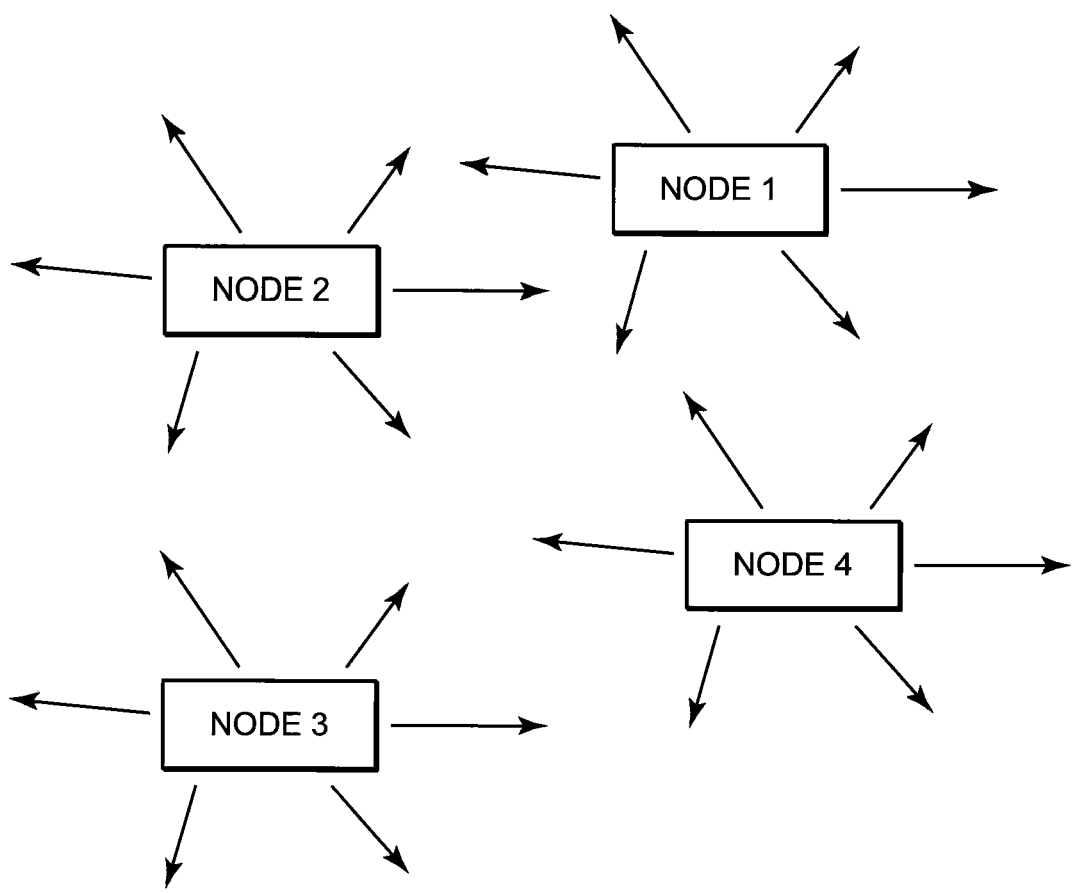
FIG. 9 is a schematical drawing to show a wireless communication network including a plurality of nodes in a second embodiment of the invention.

Next, description will be given on the second embodiment of the invention. FIG. 9 is a schematical drawing to illustrate a wireless communication network including a plurality of nodes 1 to 4 in the second embodiment of the invention. In FIG. 9, each of the plurality of nodes is a wireless communication node, which can directly communicate with other nodes present in the neighborhood (within wireless propagation range) of each of the nodes 1 to 4. Each of the nodes 1 to 4 can change the node, with which it can communicate when it moves. The nodes 1 to 4 may be mobile or may be fixedly set.

The nodes 1 to 4 are the nodes to perform wireless communication as described above. Each of these nodes is a node, which automatically starts and stops a receiver (hereinafter, may be referred as "Rx") of the wireless unit. In the schedule of the starting and the stopping, by performing the synchronization between the nodes, each node can have the same schedule.

Each of the nodes 1 to 4 in the second embodiment of the invention is a node, which is so configured that transmission and receiving of a packet are not carried out at the same time when wireless communication processing is performed. Specifically, each of the nodes 1 to 4 in the second embodiment of the invention does not receive the packet during the transmission of the packet and does not transmit the packet when the packet is being received. However, each of the nodes 1 to 4 is simply so configured that transmission and receiving of the packet are not conducted at the same time during wireless communication according to the present invention, and each node may have a function to simultaneously perform packet transmission and packet receiving at the same time. In the present specification, a unit of information to be transmitted during one transmission by each node is referred as a packet.

Figure 10:
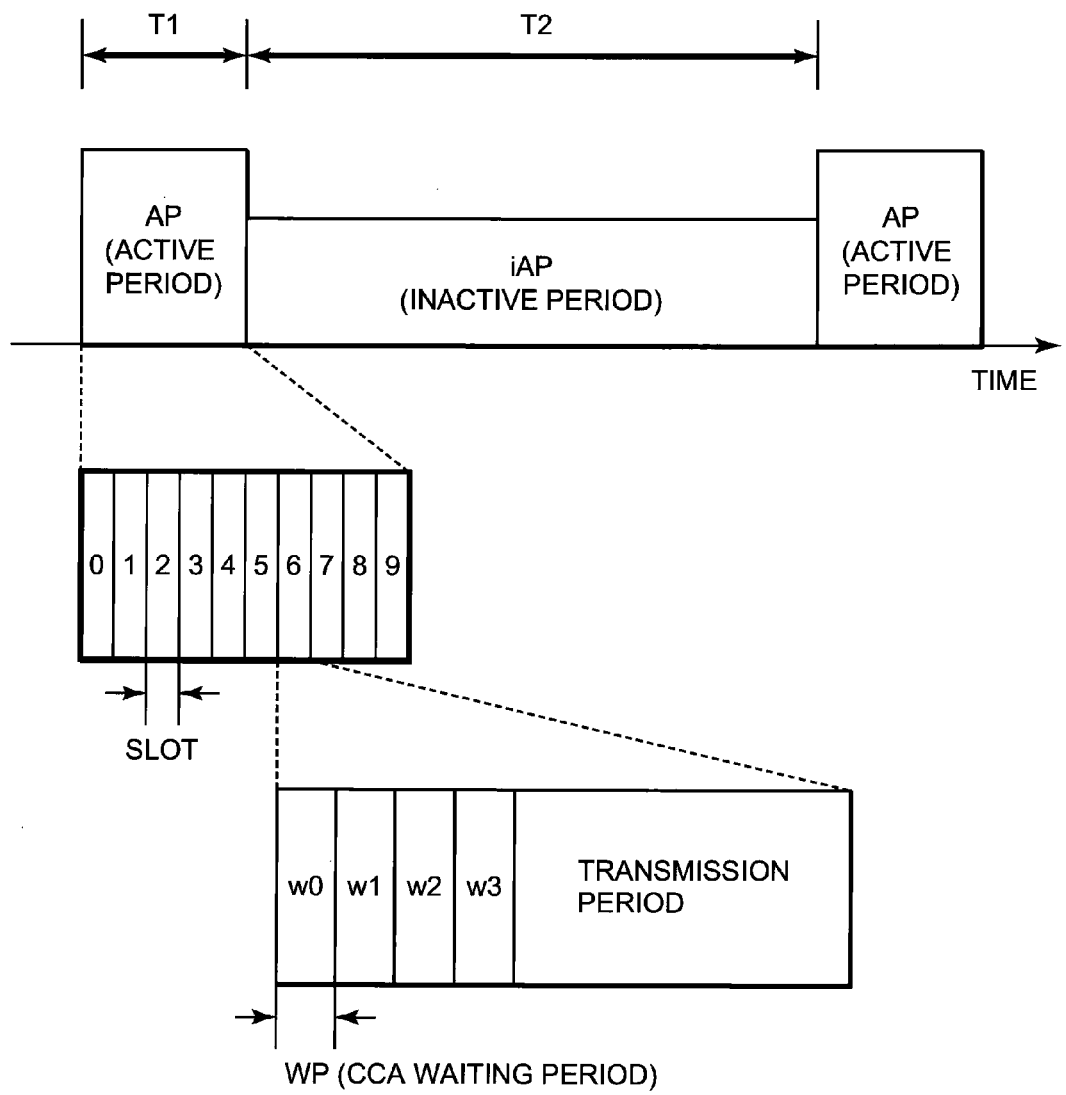
FIG. 10 is a drawing of timeslot configuration showing an actual example of schedule of starting and stopping of a receiver Rx of a wireless unit to be used in the wireless communication by using a communication channel when a node in the second embodiment of the invention performs wireless communication by using a communication channel.

FIG. 10 shows a timeslot configuration to show an actual example of the schedule of starting and stopping of the receiver Rx of the wireless unit to be used in the wireless communication via communication channel by the node in the second embodiment of the invention. In FIG. 10, a period when Rx is started is referred as "an active period" (AP), and a period when Rx is stopped is referred as "an inactive period" (iAP). In AP, the node starts Rx and receives all packets from the neighboring nodes, which are present around the node. On the other hand, in iAP, the node stops Rx, and no packet is received from the neighboring nodes. Also, by aligning the starting positions of AP between the nodes, it is possible to synchronize the starting schedule of Rx of each node.

In the present specification, an AP, in which communication is performed in a specific period, is referred as "current AP" (cAP), and an AP, which is by one step before cAP, is called "previous AP" (pAP). Further, an AP, which comes next to cAP, is called "next AP" (nAP).

Each node starts a transmitter (hereinafter, may be referred as "Tx") of the wireless unit at AP and transmits a packet. In the time to be used for transmission of the packet, AP is set in form of slots (timeslots), which are divided into a plurality of periods. When transmitting the packet, each node selects a slot and starts to transmit the packet at the selected slot. The node according to the present invention has a function to continuously use the same slot each time when AP comes. This function will be described in detail later. In the second embodiment of the invention, a method to select the slot at random is given before the packet transmission as one example of the method to select the slot, while there is no specific limitation in the slot selecting method. In FIG. 10, AP is divided to 10 slots, while the number of divisions is not limited to a specific value.

For the packet transmission within the selected slot, CSMA/CA is used, for instance. When CSMA/CA is used, by receiving within a fixed time period prior to the communication on the channel (frequency) in use, it is possible to avoid collision in the timing, at which the other node transmits the packet. This is called "Clear Channel Assessment" (CCA). If electric wave is not received on the same channel during the execution of CCA, it is judged that the other node is not transmitting the packet on the same channel. In the second embodiment of the invention, CCA is performed in order to detect whether the other node using the slot is present or not before the transmission of the packet. When it is detected that the channel is not used by CCA, the node can start data transmission.

When CCA is performed, the position to start CCA is shifted from the position to start the slot. In case the position to start CCA is the same for each node, even when the node may succeed in CCA, collision may occur in the timing to use the communication channel if another node performs CCA at the same time and succeeds in CCA. In order to reduce the probability to cause this collision, it is desirable to change the position to start CCA. In so doing, even when the use of the same slot is selected for packet transmission by a plurality of nodes, it is possible to reduce the probability of collision of the transmission timing by changing the position to start CCA at random. In case CCA is started at a position relatively earlier on a certain slot and a node uses the channel after confirming that the channel is unused, a node, which started CCA at a position relatively delayed of the same slot can detect that this channel is in use. Thus, the collision of the timing to use the channel can be avoided.

FIG. 10 shows "Waiting Period for CCA" (WP), in which four slots w0 to w3 selectable as the position to start CCA are defined. Each node selects a slot to transmit the packet when packet transmission is performed and selects WP at random. For instance, in case a node selects w0 as WP and a node selects w2 as WP, the node selecting w0 can preferentially transmit the packet. In this case, the node, which selects w0, transmits the packet from a position elapsed in time by w0 using the slot starting position as reference, and the node, which selects w2, starts CCA at the position of w2 and detects that the channel is already in use. As a result, no packet transmission is performed within the selected slot from the node, which selected w2.

However, when a plurality of nodes selected w0, collision of the packet transmission may occur. To avoid such situation, it is so designed according to the present invention that only the node, which requests slot reservation in a certain AP, can select w0 in nAP. As a result, the channel of w0 in nAP is used preferentially. In FIG. 10, the number of WPs is set to four, i.e. w0 to w3, while it can be set to any number. Also, as an example of the selection of WP from w1 to w3, the selection at random may be adopted, or other arbitrary manner of selection may be used.

Figure 11:
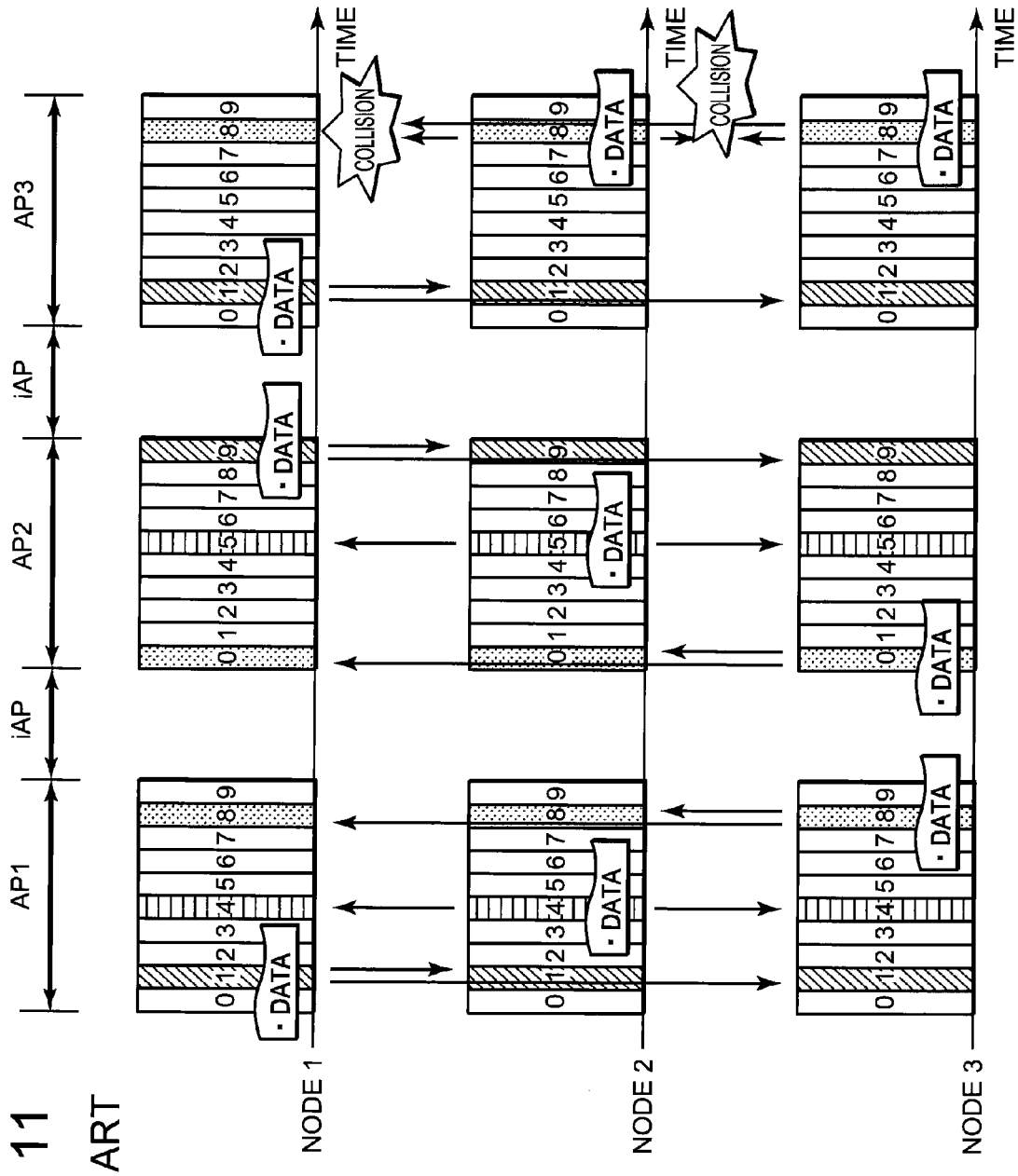
FIG. 11 is a timing chart to show an example when each of three nodes transmits a packet without slot reservation in the prior art.

FIG. 11 shows an example of a timing chart when each of three nodes 1 to 3 transmits the packet and the packet is transmitted without slot reservation according to the prior art. In this case, it is assumed that the nodes 1 to 3 are positioned at a distance where wireless communication can be executed with each other.

In the second embodiment of the invention, in order to reduce power consumption of the node, an AP, which is a time period for effective operation of the node, is set to a shorter period, and the slot where each node transmits the packet is also set to a shorter period. As a result, there is a limitation to the upper limit of data amount, which can be transmitted by a single slot. This is very similar to a communication route, which is expressed as having small MTU (Max Transfer Unit).

Each of the nodes can transmit the packet by using a plurality of slots in AP. A plurality of slots are used, for instance, in case the data, which cannot be transmitted by a single slot, are transmitted, or in case the same data are transmitted in redundancy (in duplicated manner) to improve the reliability of data propagation.

A request of such transmission node is considered as a request from an upper layer higher than MAC as described in the present invention. For instance, when a request, which requests the transmission of attributes in various types of attribute information (the types of information to be handled in the upper layer such as position information, temperature information, information on personal taste, etc.) together with the node ID, is received from the upper layer and when the data to be transmitted by the packet is in such amount that it is difficult to complete the transmission by only a single slot, the packet is transmitted by using a plurality of slots. In this case, by transmitting the packets by using a plurality of slots, it is possible to meet the requirements from the upper layer.

In FIG. 11, the packets are transmitted from a node 1 by using a slot 1 in the first AP (API). Similarly, a node 2 uses a slot 4, and a node 3 uses a slot 8 to transmit the packets.

In the second AP (AP2), the node 1 uses a slot 9, the node 2 uses a slot 5, and the node 3 uses a slot 0 to transmit the packets. In FIG. 11, no slot is reserved by the nodes 1 to 3, and the same node may use a different slot for each AP. Also, the node making the slot reservation and the node not making the slot reservation may be present in mixed state in the same wireless communication system.

It is assumed here that, in the third AP (AP3), slots are selected at random, and the node 1 selected the slot 1 and collision of transmission with the other node did not occur, but the node 2 and the node 3 selected the slot 8 at the same time, and that collision occurred in the packet transmission from these nodes.

Such collision of transmission may occur when the same WP is selected by different nodes (i.e. the node 2 and the node 3). As far as the WP to start the execution of CCA is limited (i.e. CCA waiting period is selected from a limited number of slots of WP), it is impossible to completely avoid such collision of transmission. Also, with the increase of transmitting chances by a single node and with the increase of the number of the nodes to perform packet transmission, the chances to cause such transmission collision may increase. The transmission collision occurs in the same manner in case the node performs packet transmission only once or in case the node performs packet transmission by two or more times. The transmission collision of the packets between different nodes occurs when the recognition of the slots used in AP is not commonly shared between the nodes.

Figure 12:
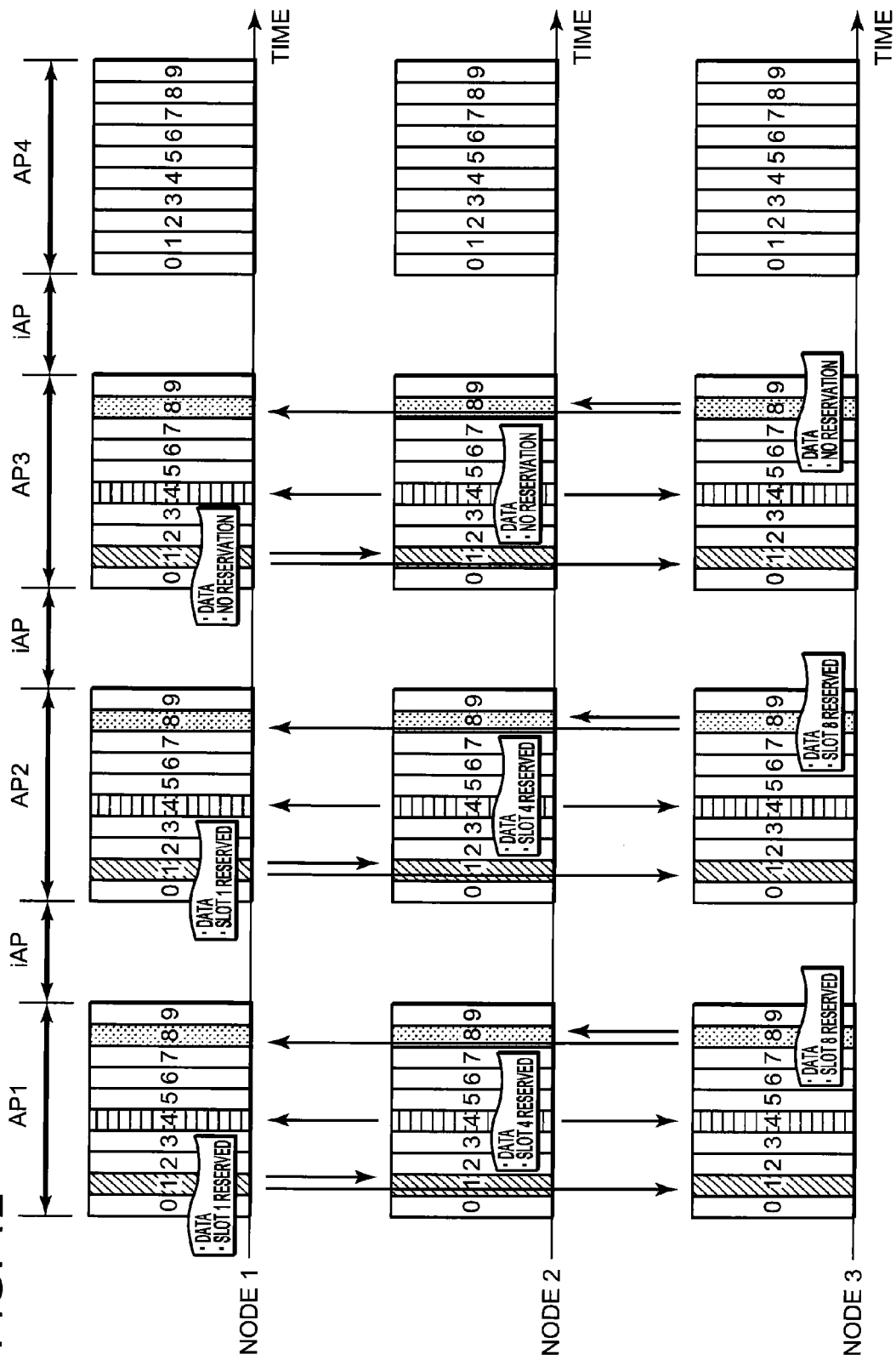
FIG. 12 is a timing chart to show an example when each of three nodes transmits a packet by slot reservation in the second embodiment of the invention.

FIG. 12 shows an example of a timing chart when each of three nodes 1 to 3 reserves the slot and transmits the packet in the second embodiment of the invention. It is supposed here that the nodes 1 to 3 are located at distances where mutual wireless communication can be carried out.

In FIG. 12, in the first AP (AP1), a node 1 is transmitting the packet by using a slot 1. At the packet transmission, it is confirmed through the execution of CCA that the channel is unused. The packets transmitted by the node 1 at the slot 1 are received at a node 2 and at a node 3. When the use of the channel is detected through CCA, the node 1 gives up packet transmission at the slot 1 and tries to transmit the packet at another slot.

It is supposed here that the node 1 has the transmission data, which may not be completed by the packet transmission at a single slot and it has a request to continue to perform packet transmission in nAP (the next AP2) and after. In this case, if the transmission method as shown in FIG. 11 is used, collision of transmission may occur. For this reason, according to the present invention, it is tried to avoid the collision of transmission by slot reservation in AP2 at the time of the first packet transmission in AP1.

The slot reservation is performed to the slot, for which the use of the channel is not detected by CCA and which has succeeded in the packet transmission. For the slot reservation, the node transmits the packet by making valid the slot reservation indicator field 1701 (to be described later) included in the packet format shown in FIG. 13, for instance, and it is possible to indicate a request to reserve the slot used in the packet transmission to the other node.

In FIG. 12, upon receipt of the packet, for which the slot reservation indicator has been made valid (the packet transmitted from the node 1 at the slot 1 in AP1), the node 2 and the node 3 detect that the node 1 has a request to continuously use the slot 1 in AP2. Then, by setting up that the slot 1 is not used in AP2, each of the node 1 and the node 3 tries to avoid transmission collision on the packet transmitted from the node 1 by using the slot 1.

The node 1, which has made the slot reservation indicator valid in AP1 and has transmitted the packet, sets WP to start CCA as w0 in the packet transmission at the slot 1 in AP2. In so doing, the node 1 can use the slot in AP2 preferentially.

Further, in case the node 1 performs slot reservation in AP3, it reserves the use of the slot 1 of AP3 in AP2. Then, it starts CCA at w0 of the slot 1 also in AP3, and packet transmission is performed. In this way, the node can continuously execute the reservation of the same slot until the data on the transmission request are completely transmitted. In case the transmission of all data requested in the transmission request has been completed in AP3, the node 1 does not transmit the packets in AP4, which is the next AP. As a result, by making the slot reservation indicator of the packet to be transmitted in AP3 invalid, the node 1 can notify the other node that the use of the slot 1 should not be reserved in AP4.

FIG. 12 shows a case where the slot 1 in AP2 and AP3 is used preferentially by reserving the slot with the same number (slot 1) in nAP at the transmission of the packets in cAP. Similarly, FIG. 12 shows a case where the node 2 reserves the slot 4 and a case where the node 3 reserves the slot 8 and packets are transmitted.

Next, description will be given on one example of a packet format, by which the slot reservation in FIG. 12 can be made possible. FIG. 13 shows one example of the packet format to be used when the node reserves the slot in the second embodiment of the invention. The packet format shown in FIG. 13 has a slot reservation indicator field 1701, a transmission source node ID field 1702, and a data field 1703.

In FIG. 13, the slot reservation indicator field 1701 is a field to notify to the other node that the same slot as the slot used in the packet transmission is also used in nAP. That is, the node reserves the slot by inserting information to indicate the slot reservation in nAP to the slot reservation indicator field 1701. The slot reservation indicator field 1701 can be realized by a flag, which indicates two types of information (valid/invalid), i.e. whether the slot is reserved or not, while it may be so configured that the slot number of the slot to be reserved is put into the slot reservation indicator field 1701.

The transmission source node ID field 1702 is a field where ID (identification information) of the node to transmit the packet is recorded. Upon receipt of the packet, the node refers to ID of the node within the transmission source node ID field 1702 and can identify the node, which has transmitted the packet.

The data field 1703 is a field where the node inserts the data, for which the node has a request to transmit. It is desirable that complete information such as attribute information (e.g. position information) of the node is given to the data field in one packet. When the node has received a plurality of packets attached to the data field 1703 with a plurality of packets by dividing the complete data to two or more parts, and the node has the function to re-synthesize the divided data as a complete data, the data to be given to the data field 1703 of one packet may not be complete.

Next, description will be given on one example of a data receiving table, which each node of the second embodiment of the invention has for the purpose of controlling the condition of the slot reservation performed by the other node. FIG. 14 is a table to show one example of the data receiving table, which each node of the second embodiment of the invention has in order to control the conditions of the slot reservation performed by the other node.

Each node has a data receiving table as shown in FIG. 14 for the purpose of controlling the conditions of the slot reservation by the other node. The data receiving table shown in FIG. 14 comprises an ID of each node, which transmitted the received packet (node ID), a slot to receive the packet (receiving packet), and the slot number reserved by the node, which transmits the packet (reserved slot).

The information contained in the data receiving table is the information, which can be acquired when the packet is received from an arbitrary node. FIG. 14 shows a data receiving table of the second embodiment of the invention, which shows that a packet to indicate that the slot in nAP is reserved is received from the node 2 at the slot 2, that a packet to indicate that a slot in nAP is reserved is received from the node 3 at the slot 5, and that a packet to indicate that the slot in nAP is not reserved is received from the node 4 at the slot 8. According to the second embodiment of the invention, it is allowed that the nodes, which reserve the slots (i.e. the node 2 and the node 3 in FIG. 14) and the node, which does not reserve the slot (i.e. the node 4 in FIG. 14) are present in mixed state. As a result, an entry of the reserved slot including reservation information of the slot in nAP and an entry of the reserved slot not including reservation information of the slot in nAP may be present.

The contents of the data receiving table include all types of information relating to all packets received up to the termination of AP. At the initiation of AP, packet receiving conditions in pAP are included in the data receiving table. It is so configured that each node selects a slot for packet transmission in cAP by utilizing the contents of the data receiving table at the time of packet receiving in pAP.

FIG. 15 shows transition of the data receiving table at the node 1 when the communication shown in FIG. 12 is performed. At the time of the initiation of AP1 in the communication shown in FIG. 12, no packet has been received in any of APs before AP1, and no information is contained in the data receiving table of each node. In this connection, when a slot is selected in AP1, the slot is selected by each node without information to refer for slot selection. In case information relating to the slot reservation is contained in the data receiving table at the initiation of AP1, the slot to be used for packet transmission is selected from the slots other than the slots reserved by the other node (i.e. the slots, which are not reserved).

At the time of the initiation of the subsequent AP2 and AP3, the contents relating to the node 2 and the node 3 as obtained from the conditions of the receiving of the packets in AP1 are given in the data receiving table. The node 1 can identify that the node 2 has reserved the slot 4 and the node 3 has reserved the slot 8 by referring to the data receiving table at the initiation of AP2 and AP3.

In the packets, which are received by the node 1 from the node 2 and the node 3 in AP3, it is indicated that slot reservation is not performed. At the time of the initiation of AP4, there is no entry relating to the reservation slot of the node 2 and the node 3. As a result, it can be identified that no slot reservation has been conducted. Although not shown in the figure, when the packets are neither transmitted nor received, no information is contained in the data receiving table of each node at the initiation of AP5, similarly to the case of the data receiving table at the initiation of AP1.

Figure 16:
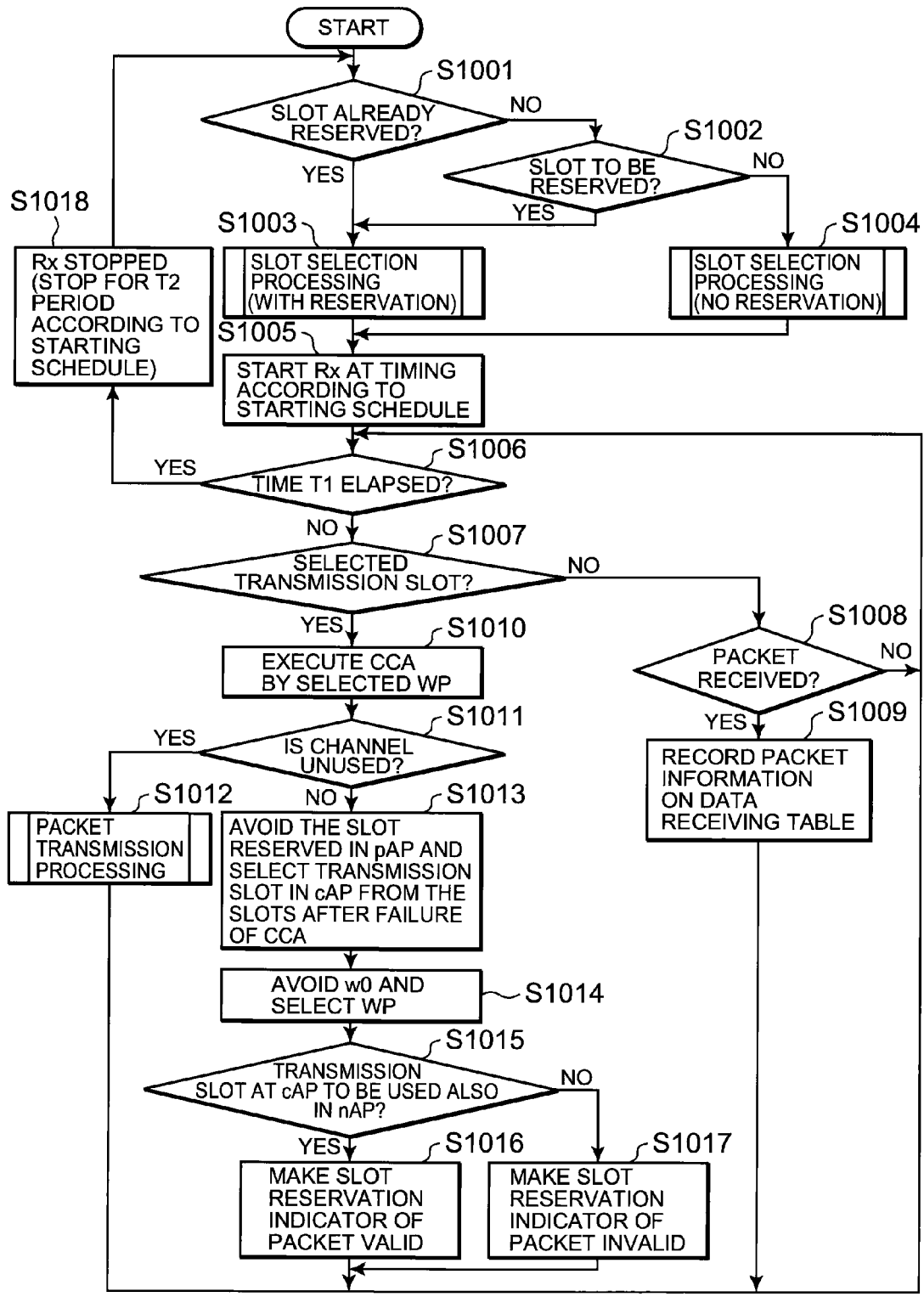
FIG. 16 is a flow chart to show an example of packet transmitting/receiving operation in the second embodiment of the invention.
Figure 17:
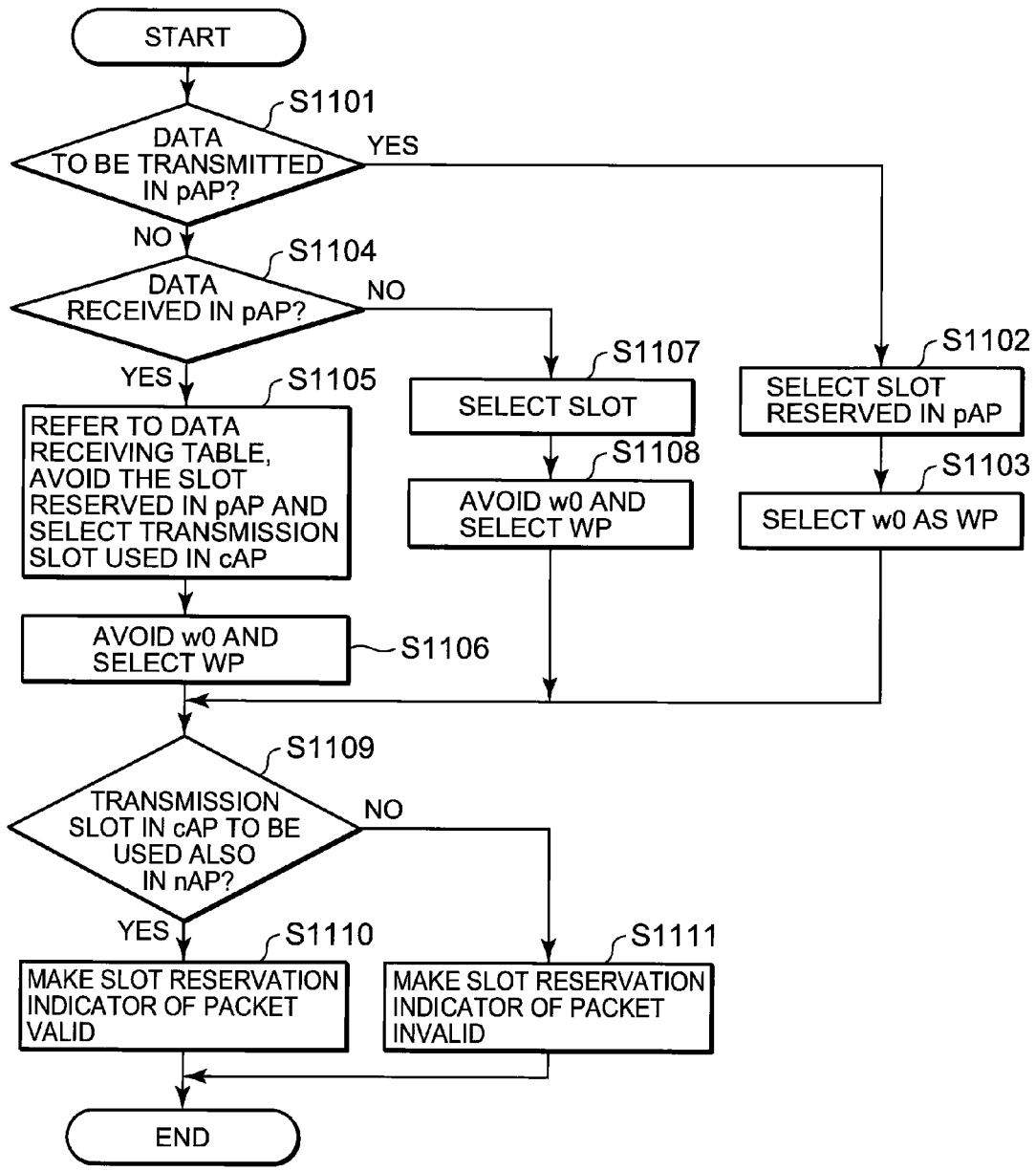
FIG. 17 is a flow chart to show an example of operation of slot selection (with reservation) in the second embodiment of the invention.
Figure 18:
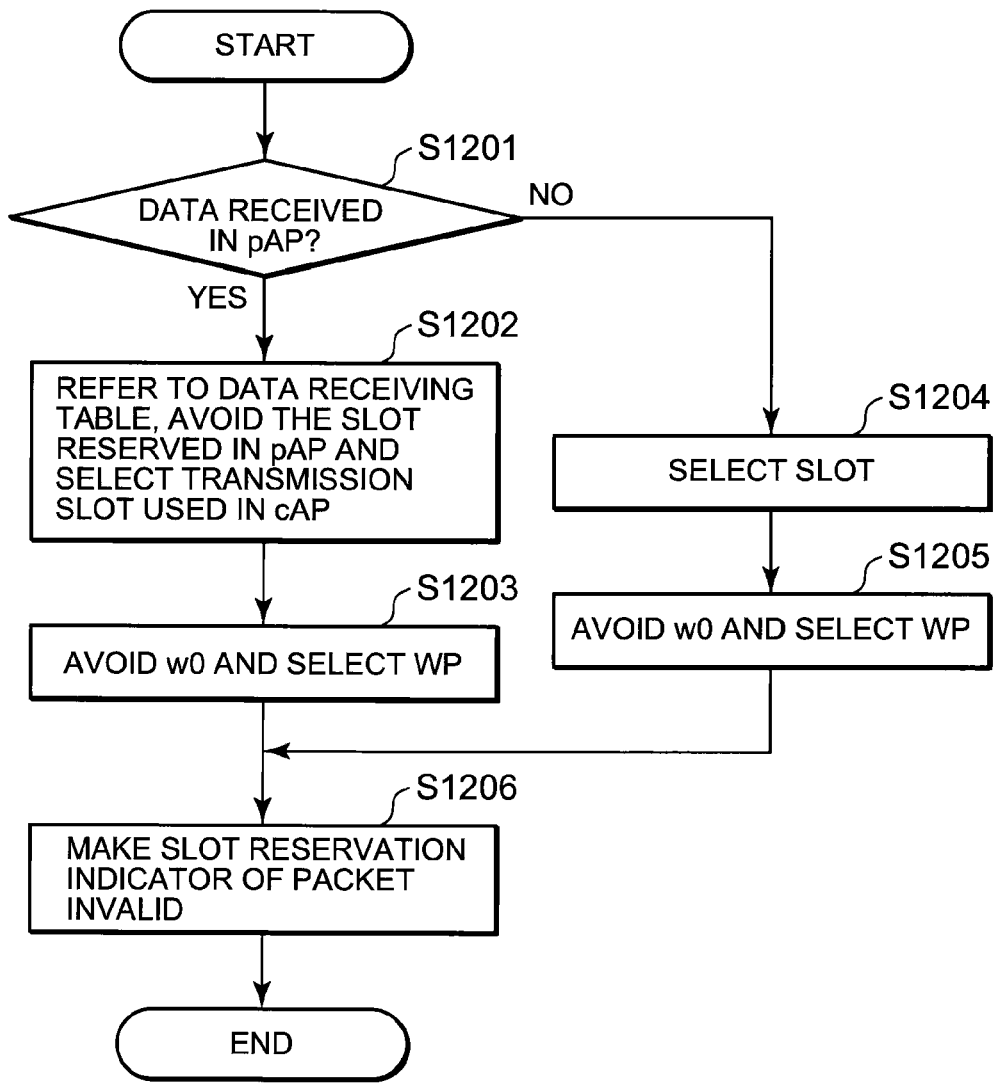
FIG. 18 is a flow chart to show an example of operation of slot selection (without reservation) in the second embodiment of the invention.

Next, description will be given on the behavior of the node in the second embodiment of the present invention. FIG. 16 shows a flow chart of one example of packet transmitting/ receiving operation in the second embodiment of the invention. FIG. 17 is a flow chart to show an example of operation of slot selection (with reservation) in the second embodiment of the invention, which corresponds to the slot selection processing (with reservation) in Step S1003 of FIG. 16. FIG. 18 is a flow chart to show an example of operation of slot selection (without reservation) in the second embodiment of the invention to correspond to the slot selection processing (without reservation) of Step S1004 in FIG. 16.

First, it is confirmed whether the node has made slot reservation or not (Step S1001). When data transmission is performed over a plurality of slots as described above, the node can reserve the transmission slot in nAP. Basically, however, it is a condition where slot reservation is not performed such as a case of new data transmission.

In case there is no slot reservation, the node judges whether the data to be transmitted is present or not and whether it is necessary to perform data transmission over a plurality of slots or not. Then, it is decided whether the slot reservation should be made or not (Step S1002).

In case it is judged in Step S1002 that it is necessary to make slot reservation, slot selection processing (with reservation) is performed (Step S1003). On the other hand, if it is judged that there is no need to perform slot reservation, slot selection processing (without reservation) is performed (Step S1004).

Here, referring to FIG. 17 and FIG. 18, description will be given on slot selection processing (with reservation) in Step S1003 and on slot selection processing (without reservation) in Step S1004.

In the slot selection processing (with reservation) in Step S1003, a processing as shown in FIG. 17 is carried out, for instance. In FIG. 17, the node first confirms whether the data has been transmitted or not (Step S1101). In case data has been transmitted in pAP, the node selects a slot reserved in pAP (i.e. transmission slot in pAP) for packet transmission (Step S1102), and w0 is selected as WP (Step S1103).

On the other hand, in case data transmission is not performed in pAP, it is confirmed whether data has been received from the other node or not (Step S1104). This confirmation in Step S1104 can be carried out by referring to the data receiving slot as described above.

In case data receiving is performed in pAP, the node refers to the data receiving table and the transmission slot used in cAP is selected (Step S1105) by avoiding the slot reserved in pAP (i.e. the reservation slot designated by each node), and WP is selected in the selected slot by avoiding w0 (Step S1106).

On the other hand, in case the data receiving is not performed in pAP, the node selects the transmission slot at random (Step S1107), and WP is selected by avoiding w0 at the selected slot (Step S1108).

After the transmission slot and WP have been selected in each case, the node judges whether the transmission slot in cAP should also be used in nAP or not (Step S1109). This judgment in Step S1109 is made depending on the transmission data amount delivered from the upper layer. If it is necessary to perform the packet transmission over a plurality of slots, for instance, the slot reservation indicator of the packet is made valid, and the slot reservation in nAP is performed (Step S1110). On the other hand, if it is not necessary to perform the packet transmission over a plurality of slots, for instance, the slot reservation indicator of the packet is made invalid (Step S1111).

In the slot selection processing (without reservation) in Step S1004, the processing shown in FIG. 18 is executed, for instance. In FIG. 18, the node first confirms whether the data has been received or not in pAP (Step S1201).

In case the data receiving is performed in pAP, the node refers to the data receiving table and selects the transmission slot to be used in cAP (Step S1202) by avoiding the slot reserved in pAP (i.e. reservation slot designated by each node), and selects WP by avoiding w0 in the selected slot (Step S1203).

On the other hand, in case the data receiving is not performed in pAP, the node selects the transmission slot at random, for instance (Step S1204), and selects WP by avoiding w0 at the selected slot (Step S1205).

After the transmission slot and WP have been selected in each case, the node indicates that slot reservation will not be performed by making the slot reservation indicator of the packet invalid (Step S1206).

In FIG. 16, the node performs the slot selection processing (with reservation) of Step S1003 and the slot selection processing (without reservation) of Step S1004 and starts Rx (Step S1005) at the timing in association with the starting schedule (e.g. the timing of the initiation of AP) and monitors the elapsed time from the starting (e.g. whether the time has elapsed by a given time period T1 or not) (Step S1006).

In case the fixed time T1 has not elapsed after the starting of Rx, the node monitors whether it has been turned to the transmission slot as selected by the slot selection processing (with reservation) of Step S1003 or by the slot selection processing (without reservation) of Step S1004 (Step S1007). If it is not the transmission slot, it monitors whether the packet is sent from other node or not (Step S1008). If the packet is not received from the other node, it is shifted to Step S1006, and the monitoring is continued. On the other hand, if the packet is received from the other node, the node records the received packet information on the data receiving table (Step S1009), and it is shifted to Step S1006, and the monitoring is continued.

On the other hand, if it is turned to the transmission slot, CCA is carried out (Step S1010) at the timing of WP as selected by the slot selection processing (with reservation) of Step S1003 or by the slot selection processing (without reservation) of Step S1004, and it is confirmed whether the channel is unused or not (Steps S1011). In case it is confirmed that the channel is unused in Step S1012, the node performs the packet transmission processing (Step S1012), and it is turned back to Step S1006, and the monitoring is continued.

On the other hand, if it is found that the channel is not unused in Step S1011, the data receiving table is referred, and the transmission slot in cAP is selected from the slots after the failure of CCA by avoiding the slot reserved by the other node in pAP (Step S1013). Further, WP is selected at random by avoiding w0, for instance, at the transmission slot selected in cAP (Step S1014).

Also, the node judges whether the transmission slot in cAP should be used in nAP or not (Step S1015). If it is necessary to perform packet transmission over a plurality of slots, for instance, the slot reservation indicator of the packet is made valid, and the slot reservation in nAP is carried out (Step S1016). In the meantime, in case it is not necessary to perform packet transmission over a plurality of slots, for instance, the slot reservation indicator of the packet is made invalid (Step S1017). Then, after deciding that the slot reservation indicator of the packet is made valid or invalid in Steps S1016 or S1017, it is turned back to Step S1006, and the monitoring is continued.

In case a fixed time period T1 has elapsed from the starting of Rx in Step S1006, the node stops Rx (Step S1018). The stopping of Rx is continued after the stopping of Rx for a fixed time period T2 according to the starting schedule, it goes back to the processing again, which starts from Step S1001. In so doing, the starting of Rx is limited to the time period necessary for transmission and receiving of the packet, and this makes it possible to reduce power consumption of Rx.

Figure 19:
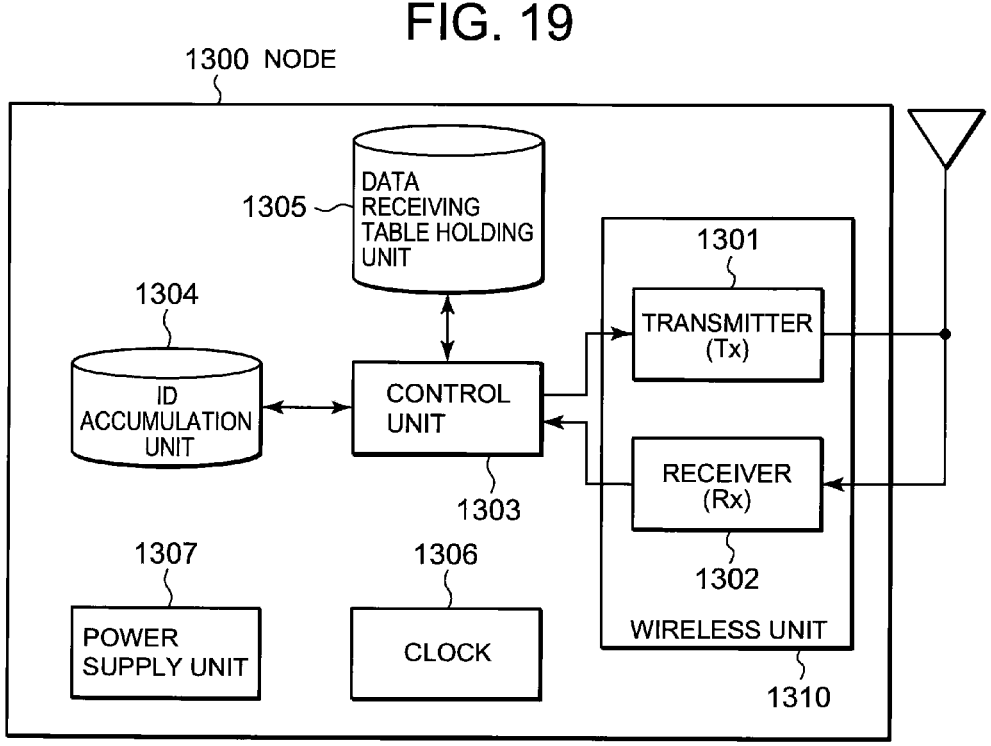
FIG. 19 is a block diagram to show an example of configuration of nodes in the second embodiment of the invention.
Figure 20:
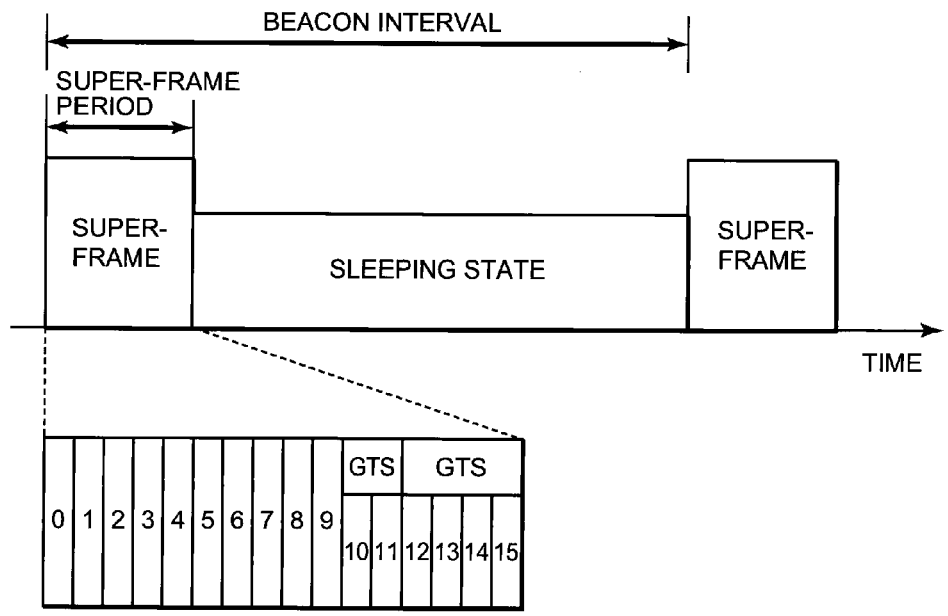
FIG. 20 is a drawing to explain a timeslot configuration in a conventional type synchronized system.
Figure 21:
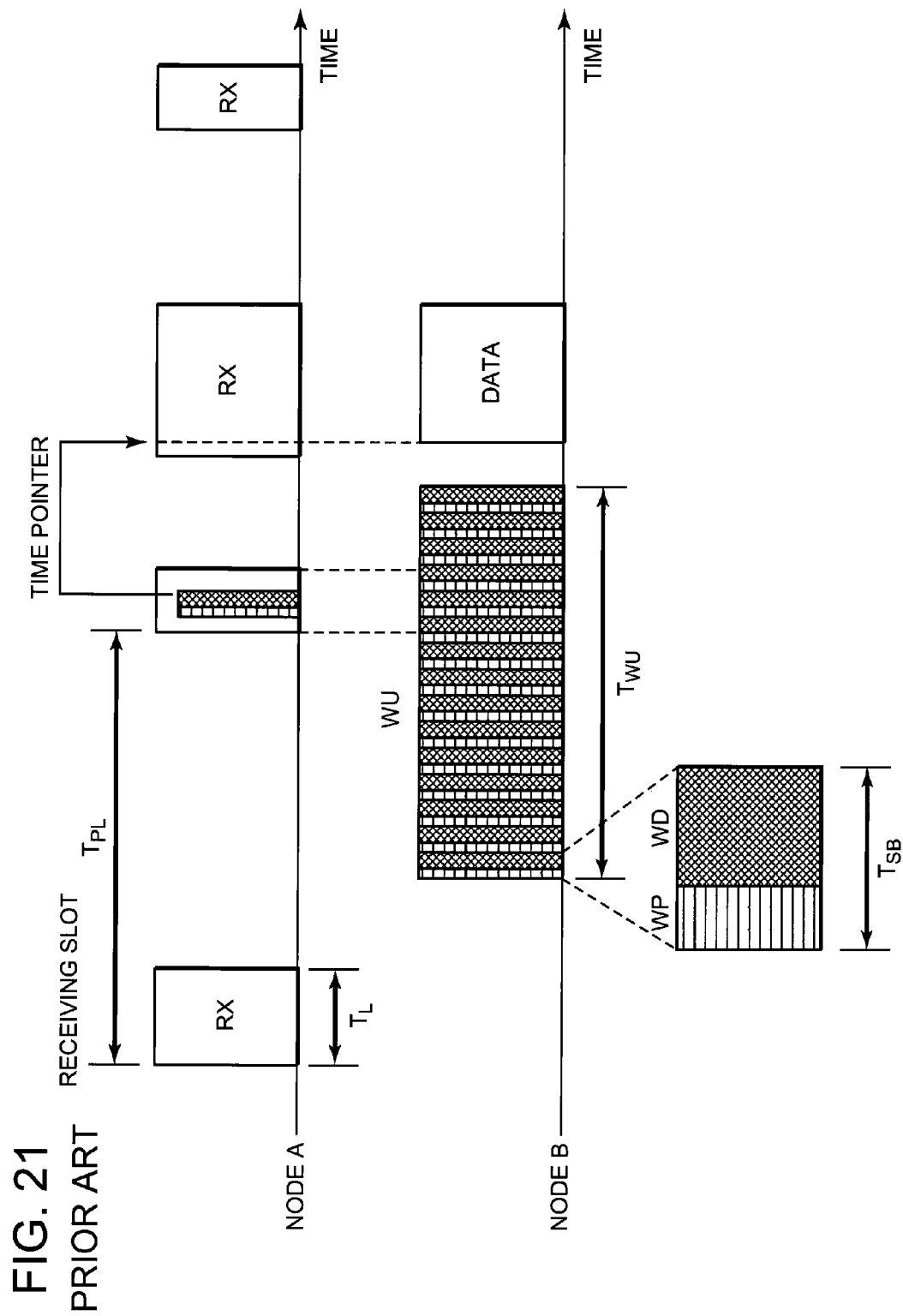
FIG. 21 is a drawing to explain the timing of transmission and receiving in a conventional type non-synchronized system.

Next, referring to FIG. 19, description will be given on the function of the node in the second embodiment of the invention. FIG. 19 is a block diagram to show an example of a configuration of the node in the second embodiment of the invention. Although each function of the node is represented by a block in FIG. 19, the function represented by each block may be achieved by hardware and/or software.

A node 1300 shown in FIG. 19 comprises a wireless unit (radio communication unit) 1310 having a transmitter (Tx) 1301 and a receiver (Rx) 1302, a control unit 1303, an ID accumulation unit 1304, a data receiving table holding unit 1305, a clock 1306, and a power supply unit 1307.

The transmitter 1301 has a function to transmit a frame including its own ID to outside via wireless means. As described above, ID transmission at the transmitter 1301 is carried out by broadcasting. The receiver 1302 has a function to receive a frame including ID transmitted by other P2P tag or GW in similar manner.

The control unit 1303 has a function to control the behavior of this node 1300, for instance. The control unit 1303 also has a function to control the timing of ID transmission at the transmitter 1301 according to a clock signal obtained from the clock 1306. Also, the control unit 1303 has a function to accumulate IDs of the other P2P tags received at the receiver 1302 in the ID accumulation unit 1304. Further, the control unit 1303 has a function to perform reading/writing of information in the data receiving table according to the content of the received packet or to the slot number of the packet received. The control unit 1303 has also a function to control the operation as shown in FIG. 16 to FIG. 18.

The ID accumulation unit 1304 has a function to accumulate IDs of the other P2P tags received at the receiver 1302. When IDs are accumulated at the ID accumulation unit 1304, time information at each moment may be recorded together with ID. The data receiving table holding unit 1305 has a function to hold the data receiving table as described above (see FIG. 14 and FIG. 15).

The clock 1306 has a function to output a clock signal to identify the timing of the frame transmission at the transmitter 1301 or the timing of the frame receiving at the receiver 1302. The power supply unit 1307 is a power source incorporated in the node 1300. For instance, it is a battery mounted within a cubicle of the node 1300.

In the present specification, the techniques relating to the first and the second embodiments of the invention are described in different modes of implementation, while, by combining these techniques, it is possible to effectively achieve the reduction of power consumption of each wireless node or to perform efficient access control.

INDUSTRIAL APPLICABILITY

According to the present invention, it is possible to reduce power consumption of each wireless node and to achieve efficient access control in the wireless communication system. The present invention can be applied in a wireless network system. In particular, it can be applied to an electronic tag system or a sensor network system, for which the reduction of power consumption at each communication node is an important factor.

The invention claimed is:

1. A communication control method in a wireless communication system having a plurality of wireless nodes and a basis node where a given period is divided into an active period and a sleep period and repeated, the active period consisting of a plurality of timeslots each with a fixed length where the plurality of wireless nodes and the basis node can transmit and receive frames, respective transmitting/receiving units of the plurality of wireless nodes being in an inactive state in the sleep period, and the basis node transmits a frame indicating a basis timeslot at the basis timeslot repeated at the given period, comprising:

transmitting, by at least a first wireless node of the plurality of wireless nodes, a frame that includes a slot number of a timeslot of the active period utilized to transmit the frame as synchronization information, wherein the active period comprises a plurality of timeslots each having with a fixed length and respectively utilized by a respective wireless node, of the plurality of wireless nodes, and the first wireless node selects the timeslot to transmit the frame at random at a time of transmission; and calculating a start timing of an active period next to the active period where the frame is transmitted from the first wireless node, by at least a second wireless node of the plurality of wireless nodes which receives the frame transmitted from the first wireless node, based on a timing of receiving the frame and the synchronization information in the frame, to perform synchronization processing to the active period, in case that the second wireless node has not received the frame indicating the basis timeslot transmitted from the basis node.

2. The wireless communication method according to claim 1, wherein the frame transmitted from the first wireless node further includes transmission timing information within the timeslot utilized to transmit the frame as the synchronization information.

3. The wireless communication method according to claim 1, further comprising:

reserving, by a wireless of the plurality of wireless nodes, when transmitting a packet at an arbitrary timeslot in an arbitrary active period, a specific timeslot in a next active period for transmission of another packet by the wireless node in the next active period, wherein the specific timeslot in the next active period is present at a same position as the arbitrary timeslot is in the arbitrary active period.

4. A wireless communication system comprising a plurality of wireless nodes and a basis node where a given period is divided into an active period and a sleep period and repeated, the active period consisting of a plurality of timeslots each with a fixed length where the plurality of wireless nodes and the basis node can transmit and receive frames, respective transmitting/receiving units of the plurality of wireless nodes being in an inactive state in the sleep period, and the basis node transmits a frame indicating a basis timeslot at the basis timeslot repeated at the given period, wherein at least a first wireless node of the plurality of wireless nodes transmits a frame that includes a slot number of a timeslot of the active period utilized to transmit the frame as synchronization information, wherein the active period comprises a plurality of timeslots each having with a fixed length and respectively utilized by a respective wireless node, of the plurality of wireless nodes, and the first wireless node selects the timeslot to transmit the frame at random at a time of transmission; and wherein at least a second wireless node of the plurality of wireless nodes which receives the frame transmitted from the first wireless node calculates a start timing of an active period next to the active period where the frame is transmitted from the first wireless node, based on a timing of receiving the frame and the synchronization information in the frame, to perform synchronization processing to the active period, in case that the second wireless node has not received the frame indicating the basis timeslot transmitted from the basis node.

5. The wireless communication system according to claim 4, wherein the frame transmitted from the first wireless node further includes transmission timing information within the timeslot utilized to transmit the frame as the synchronization information.

6. The wireless communication system according to claim 4, wherein a wireless node, of the plurality of wireless nodes, transmits a packet at an arbitrary timeslot in an arbitrary active period and the transmission of the packet reserves a specific timeslot in a next active period for transmission of another packet by the wireless node in the next active period, and wherein the specific timeslot in the next active period is present at a same position as the arbitrary timeslot is in the arbitrary active period.

7. A wireless node in a wireless communication system having a plurality of wireless nodes and a basis node where a given period is divided into an active period and a sleep period and repeated, the active period consisting of a plurality of timeslots each with a fixed length where the plurality of wireless nodes and the basis node can transmit and receive frames, respective transmitting/receiving units of the plurality of wireless nodes being in an inactive state in the sleep period, and the basis node transmits a frame indicating a basis timeslot at the basis timeslot repeated at the given period, comprising:

a transmitter configured to transmit a frame that includes a slot number of a timeslot of the active period utilized to transmit the frame as synchronization information in case that the wireless node has received the frame indicating the basis timeslot transmitted from the basis node, wherein the active period comprises a plurality of timeslots each having with a fixed length and respectively utilized by a respective wireless node, of the plurality of wireless nodes, and the wireless node selects the timeslot to transmit the frame at random at a time of transmission; and a controller configured to calculate a start timing of an active period next to the active period where a frame is transmitted from another wireless node and includes a slot number of a timeslot of the active period utilized to transmit the frame from said another wireless node as synchronization information when the wireless node receives the frame transmitted from said another wireless node, based on a timing of receiving the frame and the synchronization information in the frame, to perform synchronization processing to the active period, in case that the wireless node has not received the frame indicating the basis timeslot transmitted from the basis node.

8. The wireless node according to claim 7,
wherein the frame transmitted from the wireless node or said another wireless node further includes transmission timing information within the timeslot utilized to transmit the frame as the synchronization information.

9. The wireless node according to claim 7,
wherein the wireless node transmits a packet at an arbitrary timeslot in an arbitrary active period and the transmission of the packet reserves a specific timeslot in a next active period for transmission of another packet by the wireless node in the next active period, and
wherein the specific timeslot in the next active period is present at a same position as the arbitrary timeslot is in the arbitrary active period.

* * * * *